United States Patent
Trepess et al.

(10) Patent No.: US 7,647,345 B2
(45) Date of Patent: Jan. 12, 2010

(54) INFORMATION PROCESSING

(75) Inventors: David William Trepess, Basingstoke (GB); Jonathan Richard Thorpe, Winchester (GB)

(73) Assignee: Sony United Kingdom Limited, Weybridge (GB)

( * ) Notice: Subject to any disclaimer, the term of this patent is extended or adjusted under 35 U.S.C. 154(b) by 427 days.

(21) Appl. No.: 10/881,983

(22) Filed: Jun. 30, 2004

(65) Prior Publication Data

US 2005/0004949 A1 Jan. 6, 2005

(30) Foreign Application Priority Data

Jul. 2, 2003 (GB) ................. 0315500.9

(51) Int. Cl.
*G06F 17/30* (2006.01)
(52) U.S. Cl. .............. 707/104.1; 707/9; 707/100; 358/2.1; 358/447; 382/100; 382/135; 382/270
(58) Field of Classification Search ................ 707/1, 707/2, 3–9, 100, 101, 104.1; 358/2.1, 447; 382/100–135, 270
See application file for complete search history.

(56) References Cited

U.S. PATENT DOCUMENTS 5,325,444 A 6/1994 Cass et al.

(Continued)

FOREIGN PATENT DOCUMENTS

EP 0 766 183 4/1997

(Continued)

OTHER PUBLICATIONS

IEEE Transactions on Neural Networks, vol. 11, No. 3, May 2000, T. Kohonen et al., "Self organization of a massive document collection", pp. 574-585.

(Continued)

*Primary Examiner*—Don Wong
*Assistant Examiner*—Hanh B Thai
(74) *Attorney, Agent, or Firm*—Oblon, Spivak, McClelland, Maier & Neustadt, L.L.P.

(57) ABSTRACT

A method of processing information items, the method comprises the steps of:
for an information item comprising primarily text information:
analysing text information of the information item to detect a set of constituent information elements relating to that information item;
detecting for each of the constituent information elements a respective degree of relative significance based on the frequency and/or nature of occurrence of the constituent information elements with respect to that information item;
selecting a subset of at least two most significant constituent information elements; and
generating a pseudo-image representative of the information item, the representative pseudo-image comprising the selected subset of constituent information elements arranged in a predetermined image layout such that:
the most significant constituent information element of the subset is represented with most prominence and at a first predetermined region within the representative pseudo-image; and
the one or more other constituent information element(s) of the subset are represented at other predetermined regions of the representative pseudo-image in dependence on the corresponding degree of relative significance of those element(s).

17 Claims, 17 Drawing Sheets

U.S. PATENT DOCUMENTS

| | | | |
|---|---|---|---|
| 5,390,259 A | | 2/1995 | Withgott et al. |
| 5,423,032 A | * | 6/1995 | Byrd et al. ..................... 707/5 |
| 5,539,843 A | * | 7/1996 | Murakami et al. .......... 382/270 |
| 5,680,511 A | * | 10/1997 | Baker et al. ................. 704/257 |
| 5,956,156 A | * | 9/1999 | Fukushima ................. 358/447 |
| 5,987,460 A | * | 11/1999 | Niwa et al. ..................... 707/6 |
| 6,167,147 A | * | 12/2000 | Mowry et al. ............... 382/135 |
| 6,192,111 B1 | * | 2/2001 | Wu ......................... 379/88.13 |
| 6,212,517 B1 | * | 4/2001 | Sato et al. ...................... 707/5 |
| 6,375,306 B1 | * | 4/2002 | Tsukagoshi .................. 347/40 |
| 6,411,962 B1 | * | 6/2002 | Kupiec ....................... 707/102 |
| 6,720,860 B1 | * | 4/2004 | Narayanaswami ......... 340/5.54 |
| 6,829,619 B1 | * | 12/2004 | Wakamatsu et al. ...... 707/104.1 |
| 6,845,374 B1 | * | 1/2005 | Oliver et al. ................... 707/5 |
| 7,058,199 B1 | * | 6/2006 | Au et al. ..................... 382/100 |
| 2002/1001678 | * | 2/2002 | Kanno ........................... 707/5 |
| 2002/0051209 A1 | * | 5/2002 | Yamada ...................... 358/2.1 |
| 2002/0059102 A1 | * | 5/2002 | Sung et al. .................... 705/14 |
| 2002/0156810 A1 | * | 10/2002 | Holland et al. .............. 707/513 |
| 2003/0026594 A1 | * | 2/2003 | Shiiyama ..................... 386/69 |
| 2003/0235807 A1 | * | 12/2003 | Paley ......................... 434/178 |

FOREIGN PATENT DOCUMENTS

| | | |
|---|---|---|
| GB | 2 339 042 A | 1/2000 |
| WO | WO 02/27508 A1 | 4/2002 |
| WO | WO 02/41190 A3 | 5/2002 |

OTHER PUBLICATIONS

Proc IJCNN, 1998, S Kasaki, "Dimensionally reduction by random mapping: fast similarity computation for clustering", pp. 413-418.

Proceedings of the Joint ACM/IEEE Conference on Digital Libraries, Portland, OR, Jul. 2002, Mark Derthick, "Interfaces for Palmtop Image Search", pp. 340-341.

Imperial College of Science, Technology & Medicine, London, United Kingdom, Proceedings of Advanced Visual Interfaces (AVI), 2002, Trento, Italy, May 2002, Oscar de Bruijn et al., "Patterns of Eye Gaze during Rapid Serial Visual Presentation.".

* cited by examiner

| | |
|---|---|
| 0 | 0 |
| 0 | 0 |
| 0 | 3 |
| 0 | 0 |
| 1 | 1 |
| 0 | 0 |
| 0 | 7 |
| 0 | 0 |
| 0 | 0 |
| 0 | 0 |
| 2 | 2 |
| . | |
| . | Fig. 4b |
| . | |
| 0 | |
| 0 | |
| 0 | |
| 0 | |
| 3 | |

Fig. 4a

INFORMATION PROCESSING

BACKGROUND OF THE INVENTION

1. Field of the Invention

This invention relates to information processing.

Although the invention is not restricted to the field of information search systems, to assist with an understanding of the invention a problem will be described with reference to that field.

2. Description of the Prior Art

There are many established systems for locating information (e.g. documents, images, emails, patents, internet content or media content such as audio/video content) by searching under keywords. Examples include internet search "engines" such as those provided by "Google"™ or "Yahoo"™ where a search carried out by keyword leads to a list of results which are ranked by the search engine in order of perceived relevance.

However, in a system encompassing a large amount of content, often referred to as a massive content collection, it can be difficult to formulate effective search queries to give a relatively short list of search "hits". For example, at the time of preparing the present application, a Google search on the keywords "massive document collection" drew 243000 hits. This number of hits would be expected to grow if the search were repeated later, as the amount of content stored across the internet generally increases with time. Reviewing such a list of hits can be prohibitively time-consuming.

In general, some reasons why massive content collections are not well utilised are:

- a user doesn't know that relevant content exists
- a user knows that relevant content exists but does not know where it can be located
- a user knows that content exists but does not know it is relevant
- a user knows that relevant content exists and how to find it, but finding the content takes a long time The paper "Self Organisation of a Massive Document Collection", Kohonen et al, IEEE Transactions on Neural Networks, Vol 11, No. 3, May 2000, pages 574-585 discloses a technique using so-called "self-organising maps" (SOMs). These make use of so-called unsupervised self-learning neural network algorithms in which "feature vectors" representing properties of each document are mapped onto nodes of a SOM.

In the Kohonen et al paper, a first step is to pre-process the document text, and then a feature vector is derived from each pre-processed document. In one form, this may be a histogram showing the frequencies of occurrence of each of a large dictionary of words. Each data value (i.e. each frequency of occurrence of a respective dictionary word) in the histogram becomes a value in an n-value vector, where n is the total number of candidate words in the dictionary (43222 in the example described in this paper). Weighting may be applied to the n vector values, perhaps to stress the increased relevance or improved differentiation of certain words.

The n-value vectors are then mapped onto smaller dimensional vectors (i.e. vectors having a number of values m (500 in the example in the paper) which is substantially less than n. This is achieved by multiplying the vector by an (n×m) "projection matrix" formed of an array of random numbers. This technique has been shown to generate vectors of smaller dimension where any two reduced-dimension vectors have much the same vector dot product as the two respective input vectors. This vector mapping process is described in the paper "Dimensionality Reduction by Random Mapping: Fast Similarity Computation for Clustering", Kaski, Proc IJCNN, pages 413-418, 1998.

The reduced dimension vectors are then mapped onto nodes (otherwise called neurons) on the SOM by a process of multiplying each vector by a "model" (another vector). The models are produced by a learning process which automatically orders them by mutual similarity onto the SOM, which is generally represented as a two-dimensional grid of nodes. This is a non-trivial process which took Kohonen et al six weeks on a six-processor computer having 800 MB of memory, for a document database of just under seven million documents. Finally the grid of nodes forming the SOM is displayed, with the user being able to zoom into regions of the map and select a node, which causes the user interface to offer a link to an internet page containing the document linked to that node.

These techniques can provide a useful way of locating useful areas of search within a massive document collection. However, it is not unlikely that the search process, even using these techniques, will produce a large number of citations. Even with the most advanced searching techniques there is still usually no substitute for a human operator sorting through the citations to establish which ones are either particularly relevant or particularly useful to his query. This often remains one of the most time-consuming parts of a computer-assisted search process.

SUMMARY OF THE INVENTION

This invention provides a method of processing information items, the method comprising the steps of:

for an information item comprising primarily text information:

a) analysing text information of the information item to detect a set of constituent information elements relating to that information item;

b) detecting for each of said set of constituent information elements a respective degree of relative significance based on at least one of a frequency and a nature of occurrence of said constituent information elements with respect to said information item;

c) selecting a subset of at least two most significant constituent information elements; and d) generating a pseudo-image representative of said information item, said representative pseudo-image comprising said selected subset of constituent information elements arranged in a predetermined image layout such that:

d.1) a most significant constituent information element of said subset is represented with most prominence and at a first predetermined region within said representative pseudo-image; and d.2) one or more other constituent information element(s) of said subset are represented at other predetermined regions of said representative pseudo-image in dependence on a corresponding degree of relative significance of those element(s).

The invention addresses the problems described above by carrying out an objective (automated) assessment of the relative significance or relevance of different constituent information elements within an information item, and from this, constructing a representative pseudo-image relating to that information item. The pseudo-image follows a predefined format so that, when the user is looking at many such pseudo-images (e.g. as a representation of the results of a search query) the user can very quickly and conveniently assimilate the content of the corresponding information items.

For a particularly high prominence, it is preferred that the most significant constituent information element is represented in a central region of the representative pseudo-image.

Again, to improve the prominence of the more relevant information, it is preferred that the predetermined regions of the representative pseudo-image have associated (e.g. different) image background colours, and/or that text information is represented in the predetermined regions of the representative pseudo-image using a text font size dependent on the relative significance of the constituent information elements represented in those regions.

The invention is particularly suited to information items which are web pages, and where the constituent information elements comprise text information.

Where an information item comprises primarily image or video information it is preferred that a representative pseudo-image is also prepared, but by a different technique, so that the representative pseudo-image comprises a representation of the image or one of a plurality of images from the information item.

A particularly advantageous technique for the user to assimilate the content of a set of information items is to display a time-sequence of (preferably co-located and/or with the same image display size) representative pseudo-images corresponding to the set of information items. This technique can be used in respect of a mixture of image-based pseudo-images and text-based pseudo-images. The standard format of the pseudo-images means that the eye is always observing the same position within the pseudo-images, again allowing a more rapid assimilation of the most relevant information.

This invention also provides an information processing system operable with respect to an information item comprising primarily text information, the system comprising:

(i) an analyser for analysing text information of said information item to detect a set of constituent information elements relating to said information item;

(ii) a detector for detecting for each of said set of constituent information elements a respective degree of relative significance based on at least one of a frequency and a nature of occurrence of said constituent information elements with respect to said information item;

(iii) a selector for selecting a subset of at least two most significant constituent information elements; and (iv) a generator for generating a pseudo-image representative of said information item, said representative pseudo-image comprising said selected subset of constituent information elements arranged in a predetermined image layout such that:

a) a most significant constituent information element of said subset is represented with most prominence and at a first predetermined region within said representative pseudo-image; and b) one or more other constituent information element(s) of said subset are represented at other predetermined regions of said representative pseudo-image in dependence on corresponding ones of said degrees of relative significance of those element(s).

Various other respective aspects and feature of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

Figure 4A:
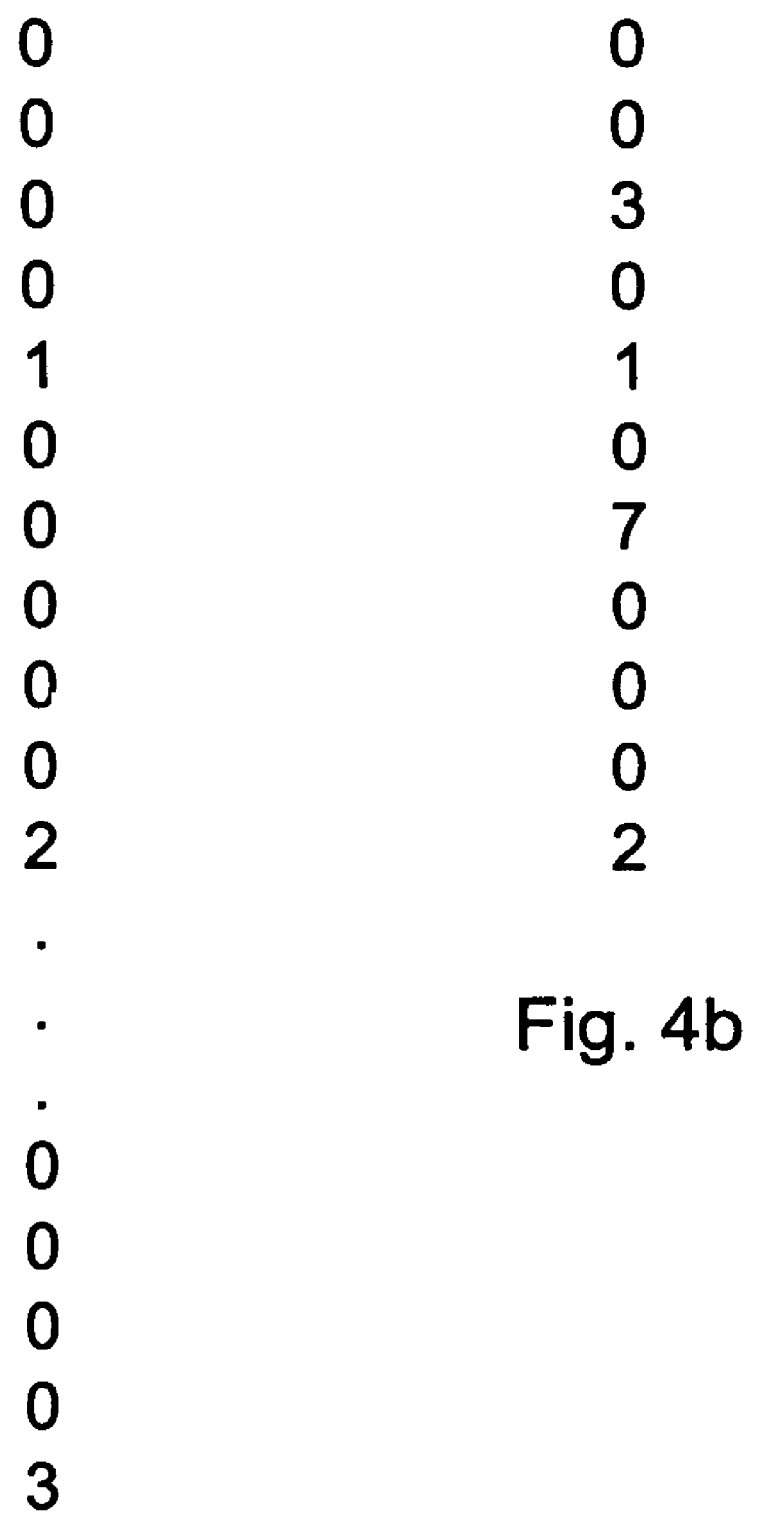

FIG. 4a schematically illustrates a raw feature vector;

FIG. 4b schematically illustrates a reduced feature vector;

DESCRIPTION OF THE PREFERRED EMBODIMENTS

Figure 1:
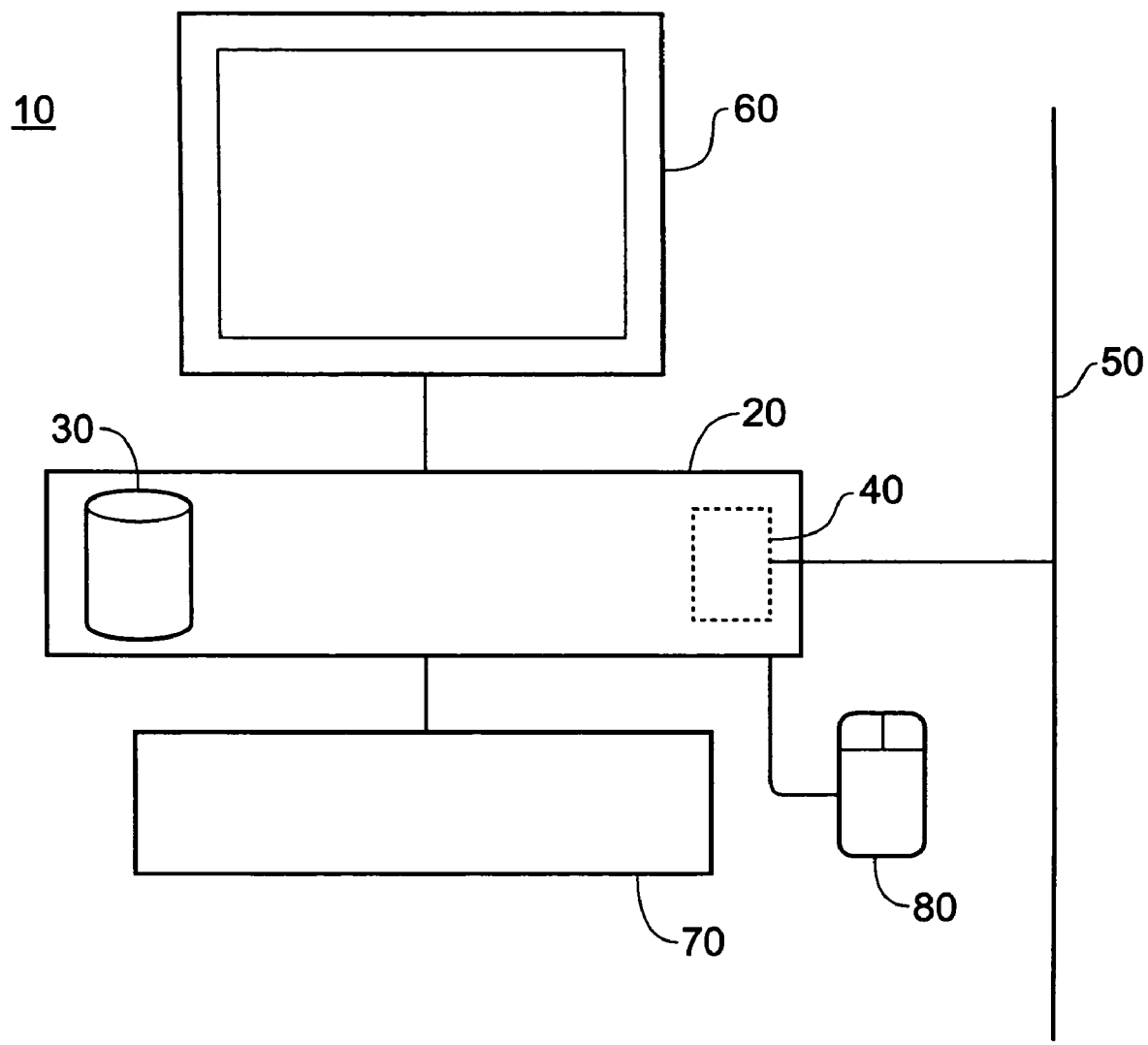
FIG. 1 schematically illustrates an information storage and retrieval system.

FIG. 1 is a schematic diagram of an information storage and retrieval system based around a general-purpose computer 10 having a processor unit 20 including disk storage 30 for programs and data, a network interface card 40 connected to a network 50 such as an Ethernet network or the Internet, a display device such as a cathode ray tube device 60, a keyboard 70 and a user input device such as a mouse 80. The system operates under program control, the programs being stored on the disk storage 30 and provided, for example, by the network 50, a removable disk (not shown) or a pre-installation on the disk storage 30.

The storage system operates in two general modes of operation. In a first mode, a set of information items (e.g. textual information items) is assembled on the disk storage 30 or on a network disk drive connected via the network 50 and is sorted and indexed ready for a searching operation. The second mode of operation is the actual searching against the indexed and sorted data.

The embodiments are applicable to many types of information items. A non-exhaustive list of appropriate types of information includes patents, video material, emails, presentations, internet content, broadcast content, business reports, audio material, graphics and clipart, photographs and the like, or combinations or mixtures of any of these. In the present description, reference will be made to textual information items. The textual information items may be associated with or linked to, non-textual items. So, for example, audio and/or video material may be associated with "MetaData" which is a textual information item defining that material in textual terms.

The information items are loaded onto the disk storage 30 in a conventional manner. Preferably, they are stored as part of a database structure which allows for easier retrieval and indexing of the items, but this is not essential. Once the information items have been so stored, the process used to arrange them for searching is shown schematically in FIG. 2.

It will be appreciated that the indexed information items need not be stored on the local disk drive 30. The information items could be stored on a remote drive connected to the system 10 via the network 50. Alternatively, information may be stored in a distributed manner, for example at various sites across the internet. If the information is stored at different internet or network sites, a second level of information storage could be used to store locally a "link" (e.g. a URI—universal resource identifier) to the remote information, perhaps with an associated summary, abstract or MetaData associated with that link. So, the remotely held information would not be accessed unless the user selected the relevant link (e.g. from the results list 260 to be described below), although for the purposes of the technical description which follows, the remotely held information, or the abstract/summary/MetaData, or the link/URI could be considered as the "information item".

In other words, a formal definition of the "information item" is an item from which a feature vector is derived and processed (see below) to provide a mapping to the SOM. The data shown in the results list 260 (see below) may be the actual information item which a user seeks (if it is held locally and is short enough for convenient display) or may be data representing and/or pointing to the information item, such as one or more of MetaData, a URI, an abstract, a set of key words, a representative key stamp image or the like. This is inherent in the operation "list" which often, though not always, involves listing data representing a set of items.

In a further example, the information items could be stored across a networked work group, such as a research team or a legal firm. A hybrid approach might involve some information items stored locally and/or some information items stored across a local area network and/or some information items stored across a wide area network. In this case, the system could be useful in locating similar work by others, for example in a large multi-national research and development organisation, similar research work would tend to be mapped to similar output nodes in the SOM (see below). Or, if a new television programme is being planned, the present technique could be used to check for its originality by detecting previous programmes having similar content.

It will also be appreciated that the system 10 of FIG. 1 is but one example of possible systems which could use the indexed information items. Although it is envisaged that the initial (indexing) phase would be carried out by a reasonably powerful computer, most likely by a non-portable computer, the later phase of accessing the information could be carried out at a portable machine such as a "personal digital assistant" (a term for a data processing device with display and user input devices, which generally fits in one hand), a portable computer such as a laptop computer, or even devices such as a mobile telephone, a video editing apparatus or a video camera. In general, practically any device having a display could be used for the information-accessing phase of operation.

The processes are not limited to particular numbers of information items.

Figure 2:
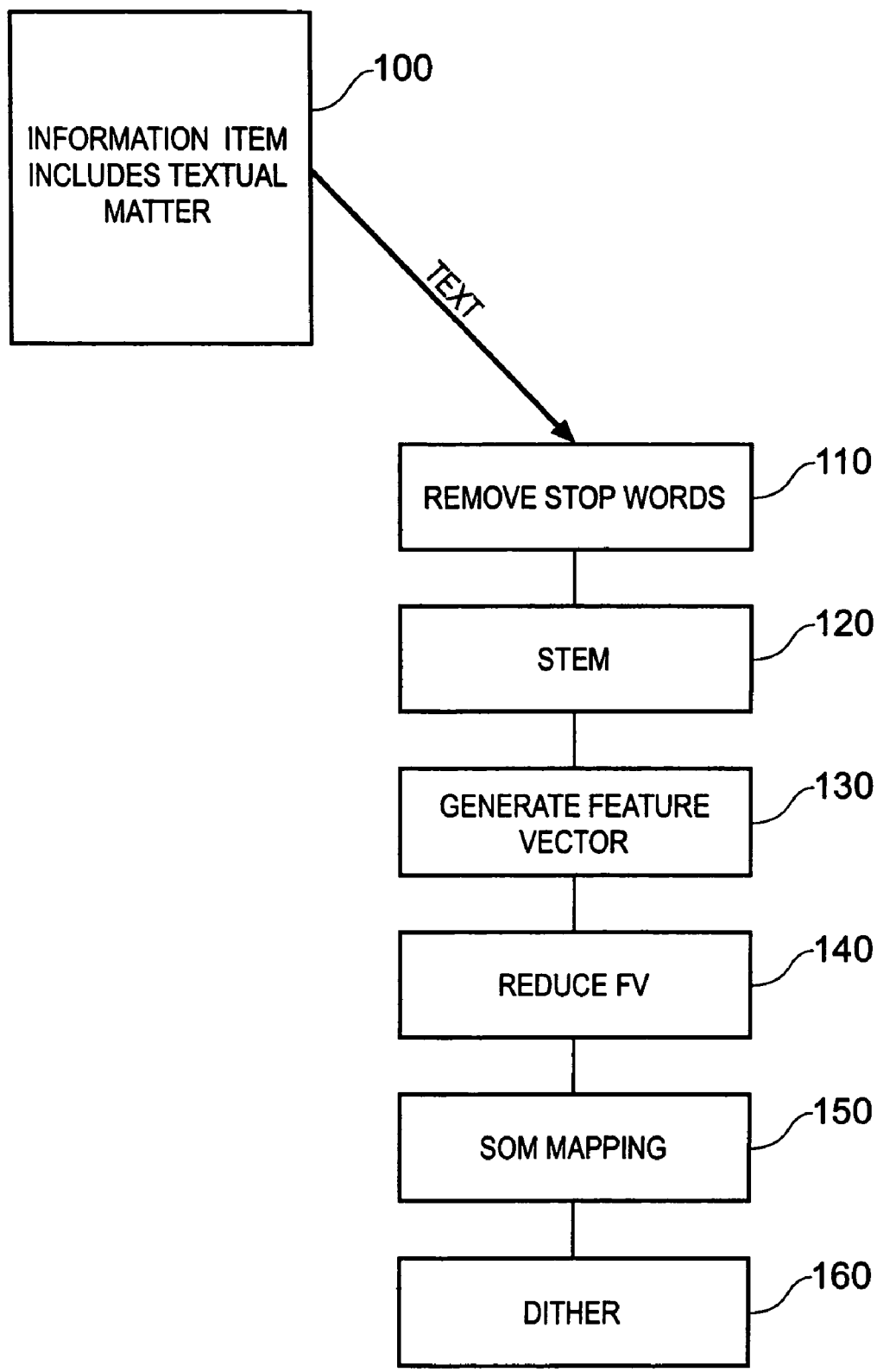
FIG. 2 is a schematic flow chart showing the generation of a self-organising map (SOM)

The process of generating a self-organising map (SOM) representation of the information items will now be described with reference to FIGS. 2 to 6. FIG. 2 is a schematic flow chart illustrating a so-called "feature extraction" process followed by an SOM mapping process.

Feature extraction is the process of transforming raw data into an abstract representation. These abstract representations can then be used for processes such as pattern classification, clustering and recognition. In this process, a so-called "feature vector" is generated, which is an abstract representation of the frequency of terms used within a document.

The process of forming the visualisation through creating feature vectors includes:

Create "document database dictionary" of terms

Create "term frequency histograms" for each individual document based on the "document database dictionary"

Reduce the dimension of the "term frequency histogram" using random mapping

Create a 2-dimensional visualisation of the information space.

Considering these steps in more detail, each document (information item) 100 is opened in turn. At a step 110, all "stop words" are removed from the document. Stop-words are extremely common words on a pre-prepared list, such as "a", "the", "however", "about", "and", and "the". Because these words are extremely common they are likely, on average, to appear with similar frequency in all documents of a sufficient length. For this reason they serve little purpose in trying to characterise the content of a particular document and should therefore be removed.

After removing stop-words, the remaining words are stemmed at a step 120, which involves finding the common stem of a word's variants. For example the words "thrower", "throws", and "throwing" have the common stem of "throw".

A "dictionary" of stemmed words appearing in the documents (excluding the "stop" words) is maintained. As a word is newly encountered, it is added to the dictionary, and running count of the number of times the word has appeared in the whole document collection (set of information items) is also recorded.

The result is a list of terms used in all the documents in the set, along with the frequency with which those terms occur. Words that occur with too high or too low a frequency are discounted, which is to say that they are removed from the dictionary and do not take part in the analysis which follows. Words with too low a frequency may be misspellings, made up, or not relevant to the domain represented by the document set. Words that occur with too high a frequency are less appropriate for distinguishing documents within the set. For example, the term "News" is used in about one third of all documents in a test set of broadcast-related documents, whereas the word "football" is used in only about 2% of documents in the test set. Therefore "football" can be assumed to be a better term for characterising the content of a document than "News". Conversely, the word "fottball" (a misspelling of "football") appears only once in the entire set of documents, and so is discarded for having too low an occurrence. Such words may be defined as those having a frequency of occurrence which is lower than two standard deviations less than the mean frequency of occurrence, or which is higher than two standard deviations above the mean frequency of occurrence.

A feature vector is then generated at a step 130.

Figure 3A:
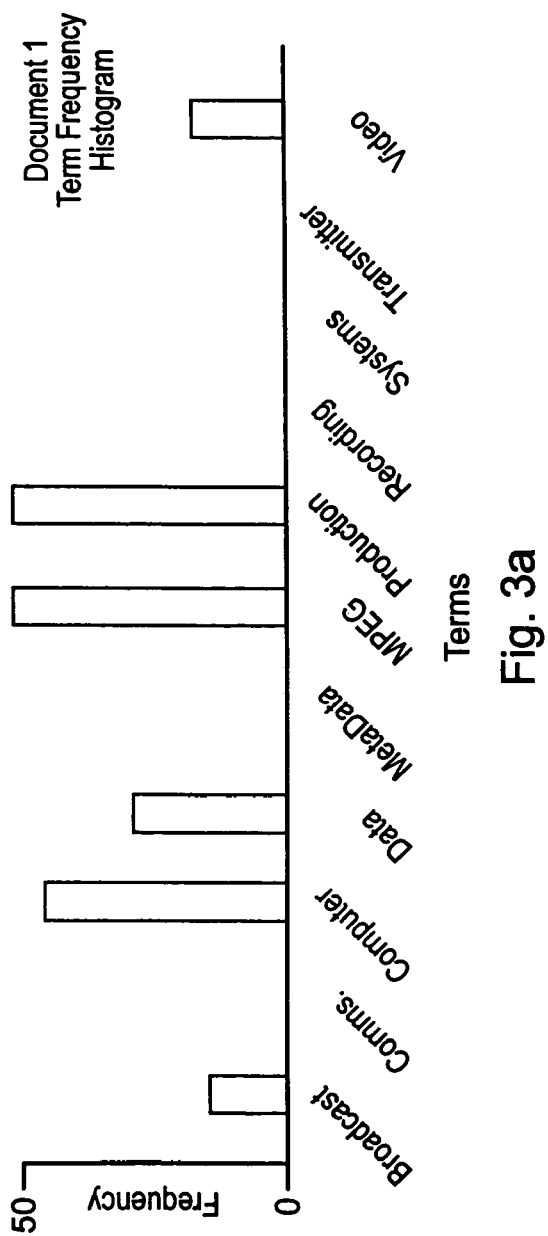
FIGS. 3a and 3b schematically illustrate term frequency histograms.
Figure 3B:
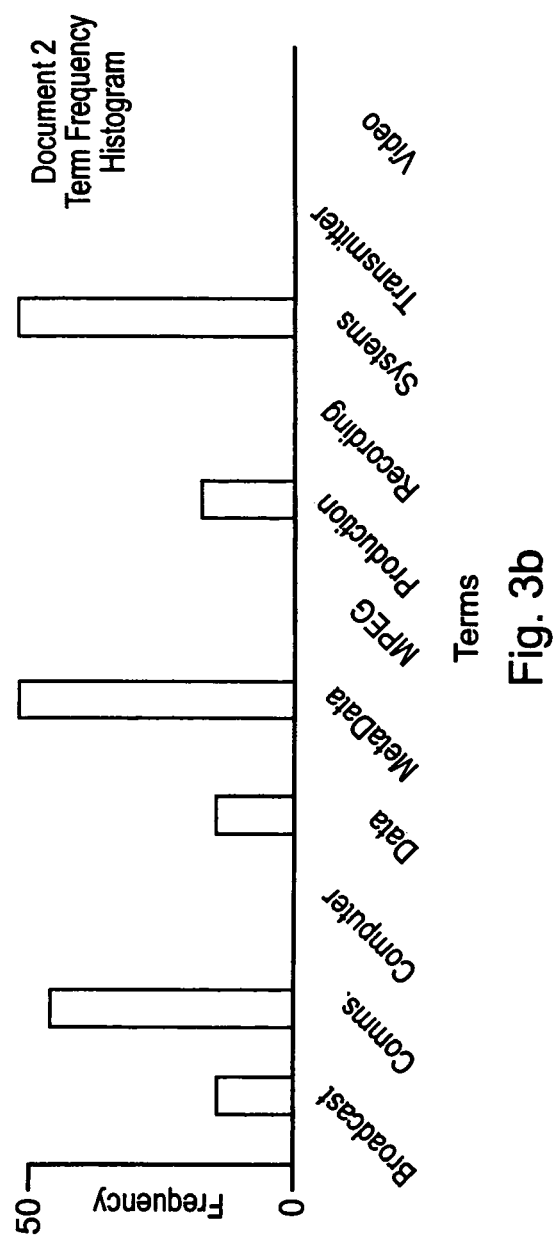

To do this, a term frequency histogram is generated for each document in the set. A term frequency histogram is constructed by counting the number of times words present in the dictionary (pertaining to that document set) occur within an individual document. The majority of the terms in the dictionary will not be present in a single document, and so these terms will have a frequency of zero. Schematic examples of term frequency histograms for two different documents are shown in FIGS. 3a and 3b.

It can be seen from this example how the histograms characterise the content of the documents. By inspecting the examples it is seen that document 1 has more occurrences of the terms "MPEG" and "Video" than document 2, which itself has more occurrences of the term "MetaData". Many of the entries in the histogram are zero as the corresponding words are not present in the document.

In a real example, the actual term frequency histograms have a very much larger number of terms in them than the example. Typically a histogram may plot the frequency of over 50000 different terms, giving the histogram a dimension of over 50000. The dimension of this histogram needs to be reduced considerably if it is to be of use in building an SOM information space.

Each entry in the term frequency histogram is used as a corresponding value in a feature vector representing that document. The result of this process is a (50000×1) vector containing the frequency of all terms specified by the dictionary for each document in the document collection. The vector may be referred to as "sparse" since most of the values will typically be zero, with most of the others typically being a very low number such as 1.

The size of the feature vector, and so the dimension of the term frequency histogram, is reduced at a step 140. Two methods are proposed for the process of reducing the dimension of the histogram.

i) Random Mapping—a technique by which the histogram is multiplied by a matrix of random numbers. This is a computationally cheap process.

ii) Latent Semantic Indexing—a technique whereby the dimension of the histogram is reduced by looking for groups of terms that have a high probability of occurring simultaneously in documents. These groups of words can then be reduced to a single parameter. This is a computationally expensive process.

The method selected for reducing the dimension of the term frequency histogram in the present embodiment is "random mapping", as explained in detail in the Kaski paper referred to above. Random mapping succeeds in reducing the dimension of the histogram by multiplying it by a matrix of random numbers.

As mentioned above, the "raw" feature vector (shown schematically in FIG. 4a) is typically a sparse vector with a size in the region of 50000 values. This can be reduced to size of about 200 (see schematic FIG. 4b) and still preserve the relative characteristics of the feature vector, that is to say, its relationship such as relative angle (vector dot product) with other similarly processed feature vectors. This works because although the number of orthogonal vectors of a particular dimension is limited, the number of nearly orthogonal vectors is very much larger.

In fact as the dimension of the vector increases any given set of randomly generated vectors are nearly orthogonal to each other. This property means that the relative direction of vectors multiplied by a matrix of random numbers will be preserved. This can be demonstrated by showing the similarity of vectors before and after random mapping by looking at their dot product.

It can be shown experimentally that by reducing a sparse vector from 50000 values to 200 values preserves their relative similarities. However, this mapping is not perfect, but suffices for the purposes of characterising the content of a document in a compact way.

Figure 5:
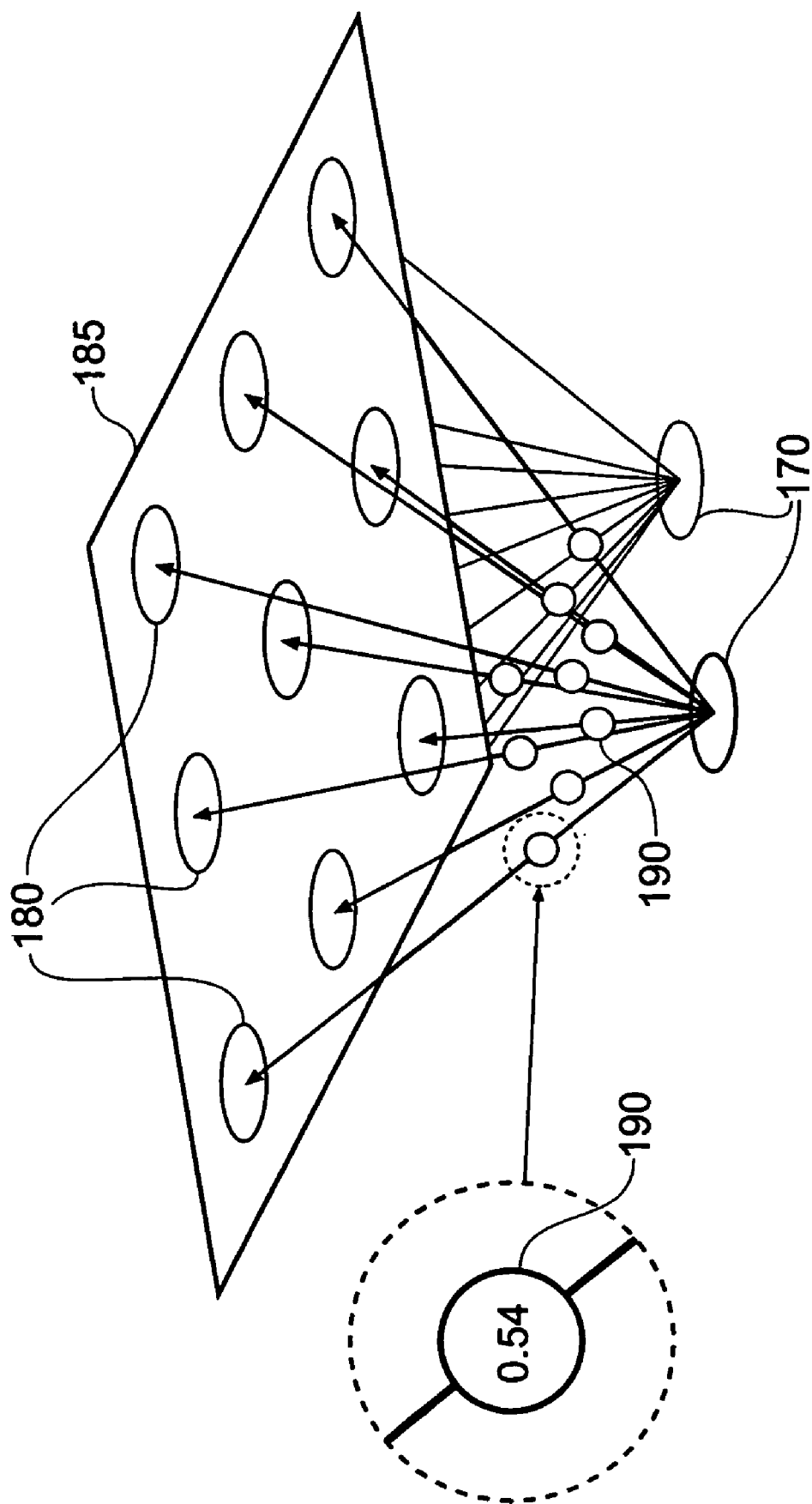
FIG. 5 schematically illustrates an SOM.

Once feature vectors have been generated for the document collection, thus defining the collection's information space, they are projected into a two-dimensional SOM at a step 150 to create a semantic map. The following section explains the process of mapping to 2-D by clustering the feature vectors using a Kohonen self-organising map. Reference is also made to FIG. 5.

A Kohonen Self-Organising map is used to cluster and organise the feature vectors that have been generated for each of the documents.

A self-organising map consists of input nodes 170 and output nodes 180 in a two-dimensional array or grid of nodes illustrated as a two-dimensional plane 185. There are as many input nodes as there are values in the feature vectors being used to train the map. Each of the output nodes on the map is connected to the input nodes by weighted connections 190 (one weight per connection).

Initially each of these weights is set to a random value, and then, through an iterative process, the weights are "trained". The map is trained by presenting each feature vector to the input nodes of the map. The "closest" output node is calculated by computing the Euclidean distance between the input vector and weights of each of the output nodes.

The closest node is designated the "winner" and the weights of this node are trained by slightly changing the values of the weights so that they move "closer" to the input vector. In addition to the winning node, the nodes in the neighbourhood of the winning node are also trained, and moved slightly closer to the input vector.

It is this process of training not just the weights of a single node, but the weights of a region of nodes on the map, that allow the map, once trained, to preserve much of the topology of the input space in the 2-D map of nodes.

Once the map is trained, each of the documents can be presented to the map to see which of the output nodes is closest to the input feature vector for that document. It is unlikely that the weights will be identical to the feature vector, and the Euclidean distance between a feature vector and its nearest node on the map is known as its "quantisation error".

By presenting the feature vector for each document to the map to see where it lies yields an x, y map position for each document. These x, y positions when put in a look up table along with a document ID can be used to visualise the relationship between documents.

Finally, a dither component is added at a step 160, which will be described with reference to FIG. 6 below.

A potential problem with the process described above is that two identical, or substantially identical, information items may be mapped to the same node in the array of nodes of the SOM. This does not cause a difficulty in the handling of the data, but does not help with the visualisation of the data on a display screen (to be described below). In particular, when the data is visualised on a display screen, it has been recognised that it would be useful for multiple very similar items to be distinguishable over a single item at a particular node. Therefore, a "dither" component is added to the node position to which each information item is mapped. The dither component is a random addition of ±½ of the node separation. So, referring to FIG. 6, an information item for which the mapping process selects an output node 200 has a dither component added so that it in fact may be mapped to any map position around a node 200 within the area 210 bounded by dotted lines on FIG. 6.

Figure 6:
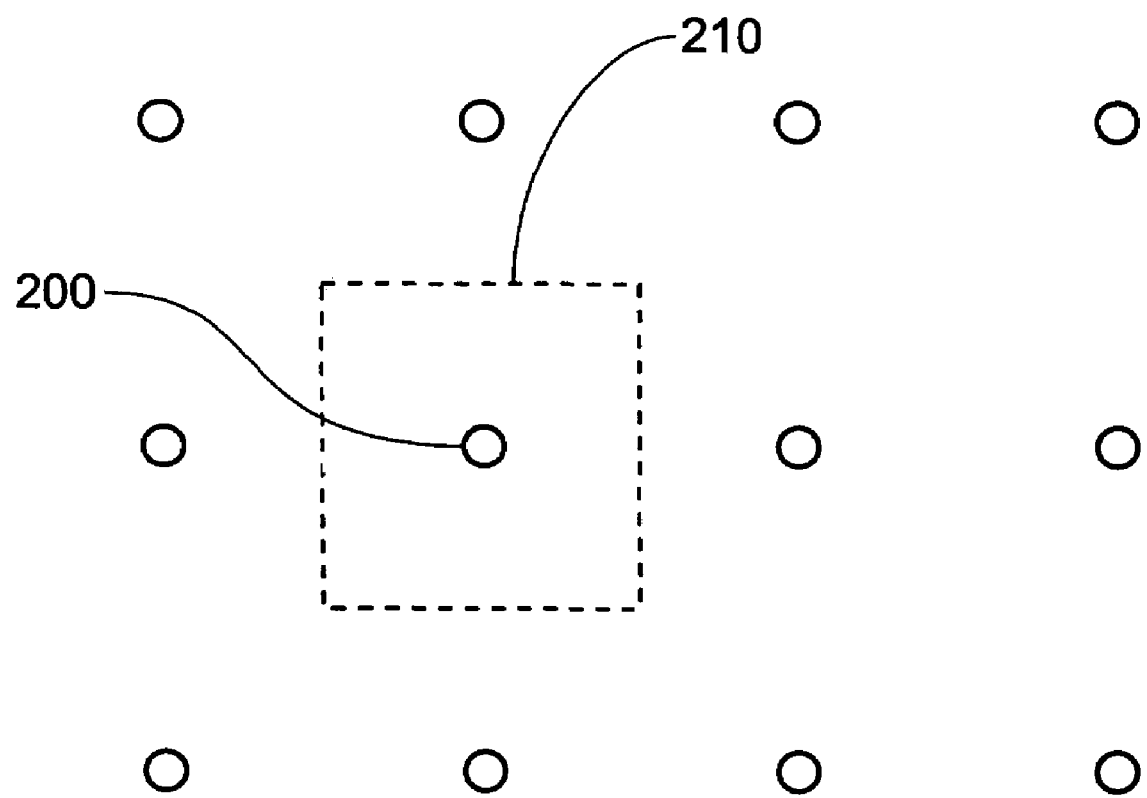
FIG. 6 schematically illustrates a dither process.

So, the information items can be considered to map to positions on the plane of FIG. 6 at node positions other than the "output nodes" of the SOM process.

At any time, a new information item can be added to the SOM by following the steps outlined above (i.e. steps 110 to 140) and then applying the resulting reduced feature vector to the "pre-trained" SOM models, that is to say, the set of SOM models which resulted from the self-organising preparation of the map. So, for the newly added information item, the map is not generally "retrained"; instead steps 150 and 160 are used with all of the SOM models not being amended. To retrain the SOM every time a new information item is to be added is computationally expensive and is also somewhat unfriendly to the user, who might grow used to the relative positions of commonly accessed information items in the map.

However, there may well come a point at which a retraining process is appropriate. For example, if new terms (perhaps new items of news, or a new technical field) have entered into the dictionary since the SOM was first generated, they may not map particularly well to the existing set of output nodes. This can be detected as an increase in a so-called "quantisation error" detected during the mapping of newly received information item to the existing SOM. In the present embodiments, the quantisation error is compared to a threshold error amount. If it is greater than the threshold amount then either (a) the SOM is automatically retrained, using all of its original information items and any items added since its creation; or (b) the user is prompted to initiate a retraining process at a convenient time. The retraining process uses the feature vectors of all of the relevant information items and reapplies the steps 150 and 160 in full.

Figure 7:
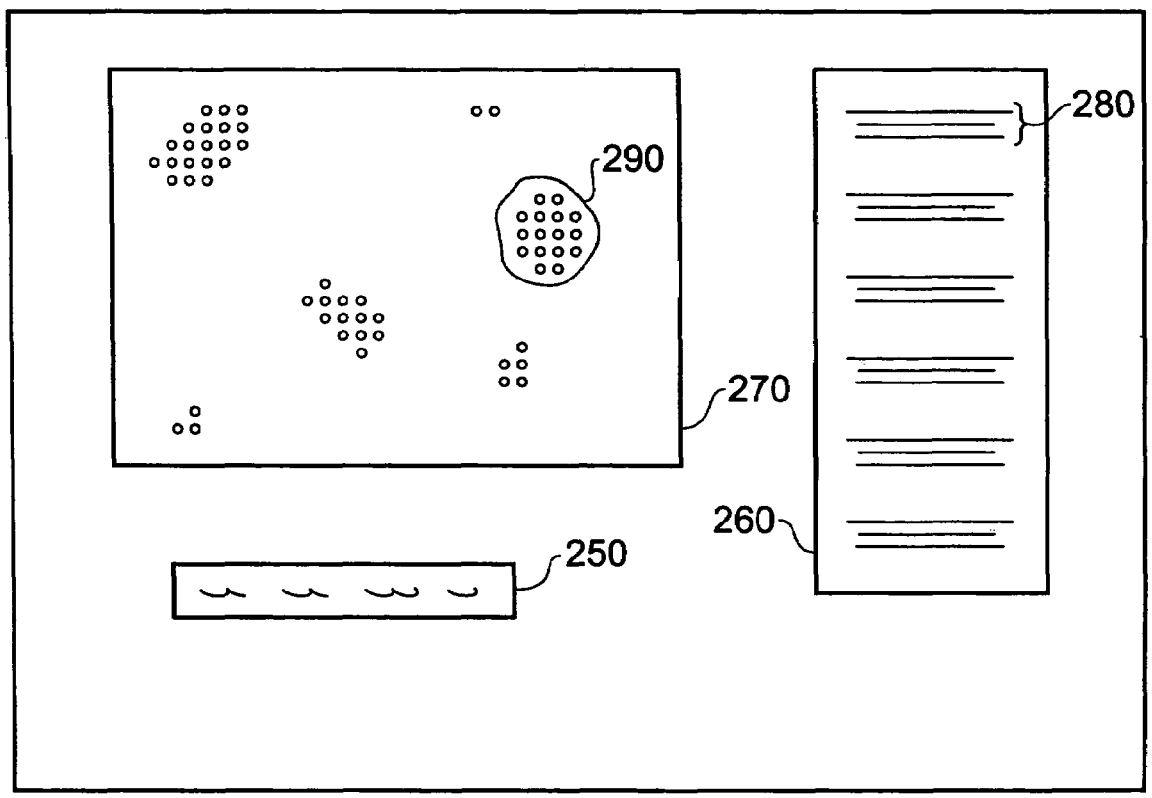
FIGS. 7 and 8 schematically illustrate display screens providing a user interface to access information represented by the SOM.

FIG. 7 schematically illustrates a display on the display screen 60 in which data sorted into an SOM is graphically illustrated for use in a searching operation. The display shows a search enquiry 250, a results list 260 and an SOM display area 270.

In operation, the user types a key word search enquiry into the enquiry area 250. The user then initiates the search, for example by pressing enter on the keyboard 70 or by using the mouse 80 to select a screen "button" to start the search. The key words in the search enquiry area 250 are then compared with the information items in the database using a standard keyword search technique. This generates a list of results, each of which is shown as a respective entry 280 in the list area 260. The display area 270 displays only points corresponding to each of the result items.

Because the sorting process used to generate the SOM representation tends to group mutually similar information items together in the SOM, the results for the search enquiry generally tend to fall in clusters such as a cluster 290. Here, it is noted that each point on the area 270 corresponds to the respective entry in the SOM associated with one of the results in the result list 260; and the positions at which the points are displayed within the area 270 correspond to the array positions of those nodes within the node array.

Figure 8:
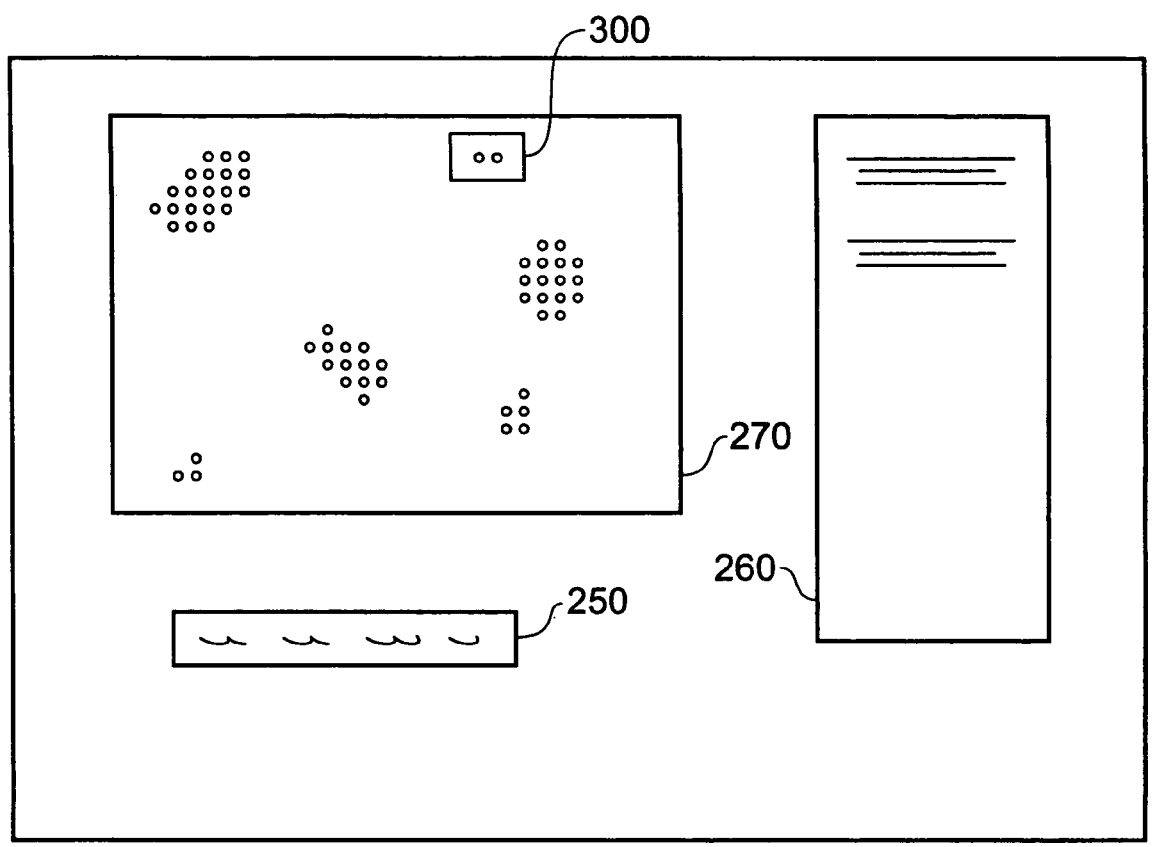

FIG. 8 schematically illustrates a technique for reducing the number of "hits" (results in the result list). The user makes use of the mouse 80 to draw a boundary, which in this example is a rectangular box 300, around a set of display points corresponding to nodes of interest. In the results list area 260, only those results corresponding to points within the boundary 300 are displayed. If these results turn out not to be of interest, the user may draw another boundary encompassing a different set of display points.

It is noted that the results area 260 displays list entries for those results for which display points are displayed within the boundary 300 and which satisfied the search criteria in the word search area 250. The box 300 may encompass other display positions corresponding to populated nodes in the node array, but if these did not satisfy the search criteria they will not be displayed and so will not form part of the subset of results shown in the list 260.

Figure 9:
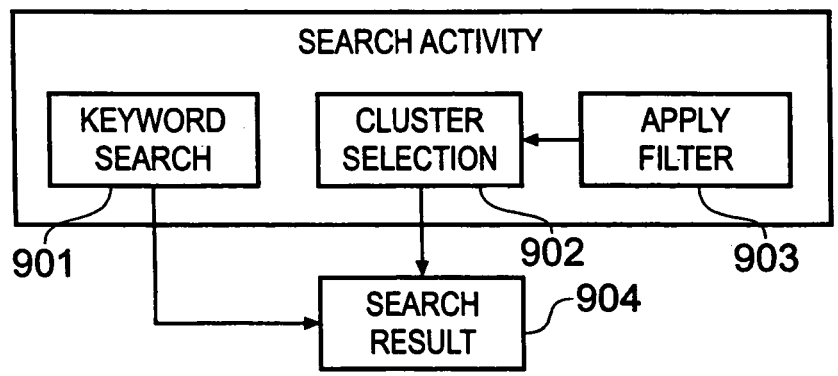
FIG. 9 is a schematic flow diagram illustrating a searching process.

Referring to FIG. 9, a user may perform a search process by using a keyword search 901 as described above with respect to FIG. 7, and/or by selecting a cluster 902 by drawing a boundary 300 as described above with reference to FIG. 8. As indicated at 903, a filter may be applied to reduce the number of "hits". The filter 903 may apply criterion such as genre, and date range, amongst other criteria, to the results of the search. The result of the search is indicated at 904.

Figure 10:
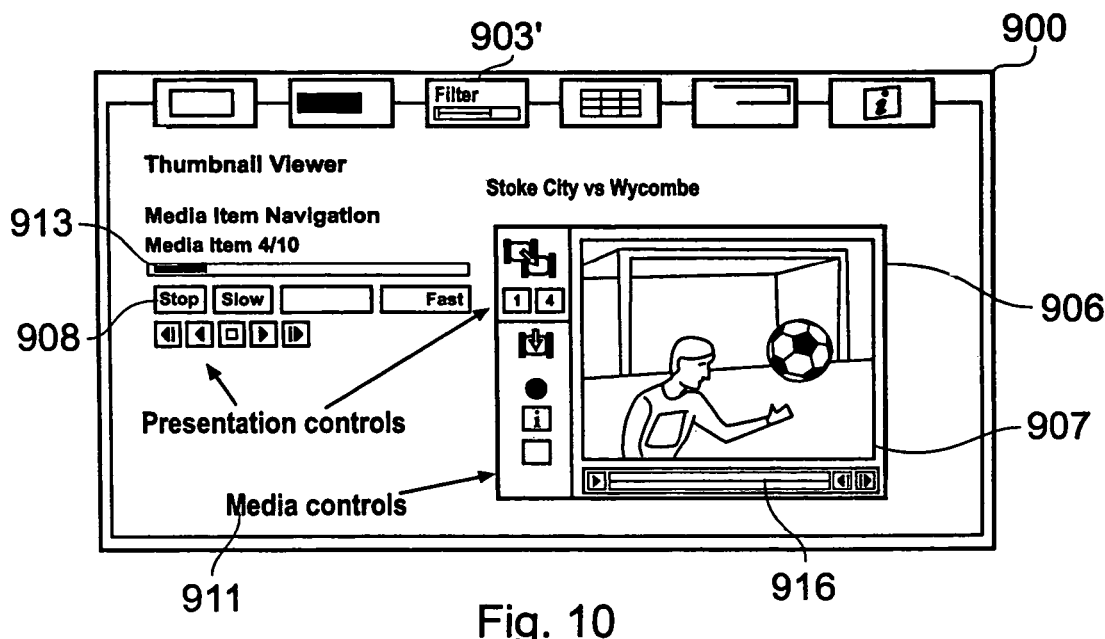
FIGS. 10 to 12 illustrate modes in accordance with the present invention for presenting the results of the search process of FIG. 9.
Figure 11:
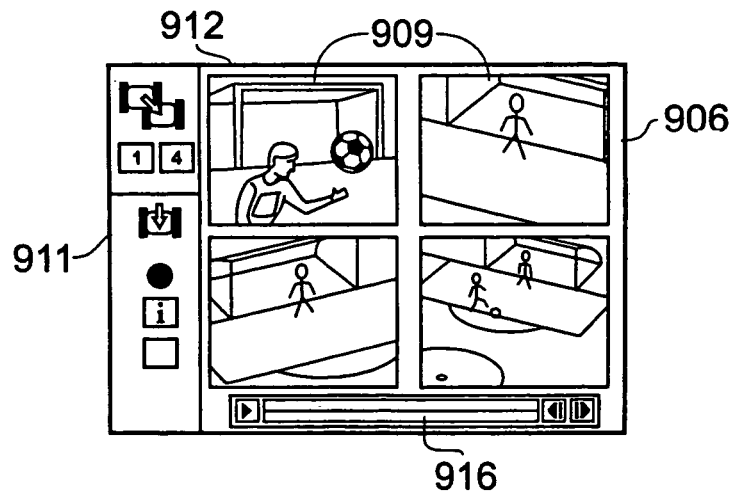
Figure 12:
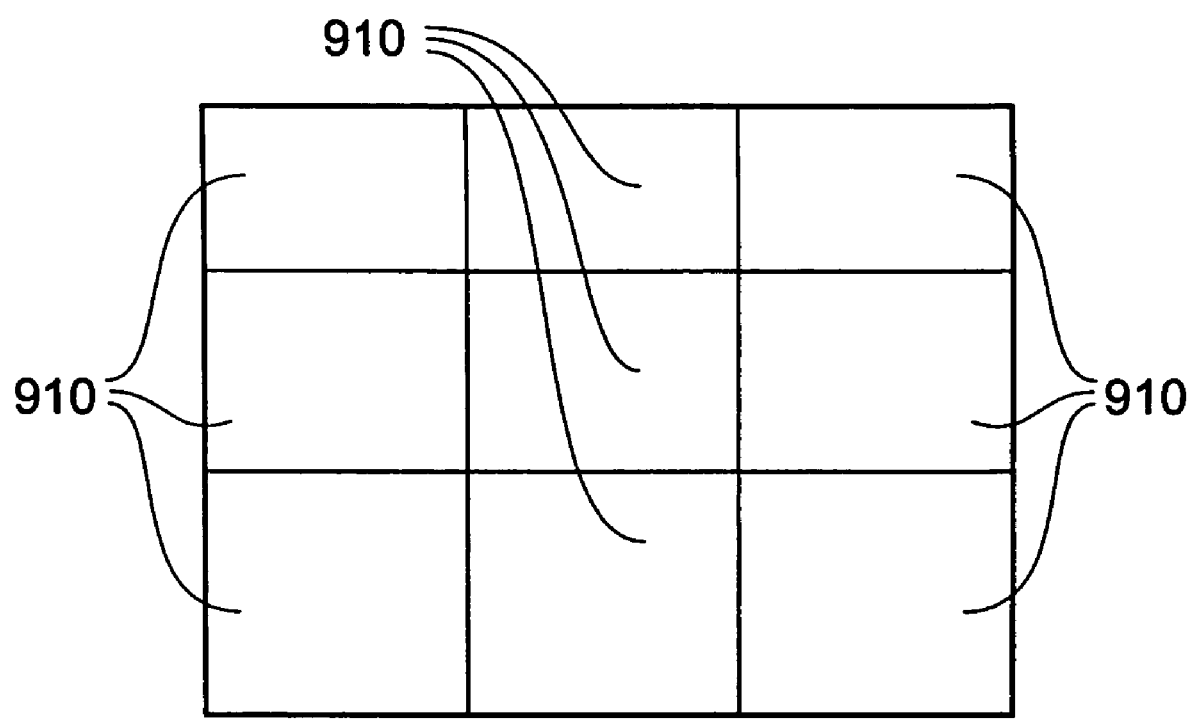

The results of the search may be displayed as shown in FIG. 10, 11 or 12. Such display of the results may be in addition to the results list 260 shown in FIGS. 7 and 8 or instead of such a display.

Even with the use of a filter 903, the search may produce a very large number of "hits". The user needs to be able to quickly determine what has been found. In the present example, the information items found by the search are represented by still images and/or video as well as thumbnail images representative of the information items. The information items may represent text documents, web pages or video images for example.

One embodiment of the present invention uses the technique of Rapid Serial Visual Presentation (RSVP) which is described in the paper "Patterns of Eye Gaze during Rapid Serial Visual Presentation", by Oscar de Bruijn & Robert Spence Imperial College of Science, Technology and Medicine, Exhibition Road, London SW7 2BT United Kingdom, Proceedings of Advanced Visual Interfaces (AVI) 2002, Trento, Italy, May 2002. As the name suggests, RSVP rapidly presents in succession many images. The paper presents several different ways of presenting images any of which may be used in the present invention. Examples of RSVP type include the following:-:

Keyhole RSVP in which only one image appears at one time, each image appearing at the same location at the same size.

Carousel RSVP in which each image describes an approximately circular trajectory from its emergence at a small size increasing to a maximum size then reducing again until it returns to its emergence location to be replaced by another image.

Collage RSVP in which a set of images is deposited in rapid sequence on a display area in such a way that many (e.g. 5 or 6) are visible at any one time.

Floating RSVP in which the initial view of an image is at the centre of a display area and small in size and which may be "out of focus". The image moves e.g. diagonally across the display area increasing in size. Many images are shown simultaneously.

Shelf RSVP in which successive images follow a predetermined trajectory (as if moving along a shelf for example) starting small at an emergence point at an edge of the display area and increasing to a maximum at the centre of the display area and reducing again to disappear at another edge. Many images are displayed simultaneously moving along the trajectory.

The images which are displayed in the RSVP are derived from the list of the search results which are returned from the keyword search 901 and/or from results of an amended search produced by drawing a boundary 300 around a cluster 902. The search may be further defined using a filter 903.

Referring to FIG. 10, one example of RSVP is shown. FIG. 10 shows a Graphical User Interface (GUI) 900 having a window 906 for displaying images 907, presentation controls 908, a filter control 903' and media controls 911, 913 and 916 amongst other controls. The filter control 903' selects filtering criteria as described above to reduce the number of "hits" provided by the search. The presentation controls 908 control one or more of the following: the RSVP type; selection of manual or automatic display of the succession of images; the rate of display if automatic display is selected; and the order of display of images; amongst other controls. The media controls 911 allow a user to select a media item, to view information about the selected item, and to control the presentation of the selected item as will be described in more detail below.

In FIG. 10, a succession of images are displayed one at a time in the window 906 corresponding to the keyhole RSVP described above In FIG. 11, the window 906 simultaneously displays four streams of images. In FIG. 11, a stream of current interest may be selected using a presentation control 908

In FIG. 12, an array of images 910 is displayed in the window 906 simultaneously, corresponding to the collage RSVP described above.

Referring again by way of example to FIG. 11, the media controls 911 may be used to select one of the four streams, as indicated by the border 912. The selection of a representation in one stream also selects the information related to that selected representation.

The media controls 911 allow the user to select one of the succession of displayed images. If for example the selected image is a representative key stamp (RKS or thumbnail) representing a video sequence, the selection of the image allows the user to access a copy of the video and view it. The image is linked to a stored copy of the information item in a similar way to a desktop icon to effect the selection (e.g. using a mouse) and subsequent viewing.

The presentation controls also include a scroll bar 913 which is a speed control for controlling the rate of presentation of images in the streams.

The presentation controls include a scroll bar 916 by which a user plays through the video of the selected image.

The streams of images in FIGS. 10 and 11 or the array of images of FIG. 12 may be accompanied by the display of the text titles of each image. Thus enables the use to spot any key words that may be of interest to them.

The sequence in which the images appear in an RSVP may be undefined. Alternatively the sequence may be defined according to a predetermined criterion set by the user: for example date order or order of relevance.

Whilst the embodiments above have been illustrated with reference to images and video representing information items sought by a user, embodiments are not limited to that. The search results 907, 909, 910 displayed may be textual items for example titles found by the search presented as a Rapid Serial Visual Presentation.

The displayed search results 907, 909, 910 may represent not the actual information items which the use seeks but links to those items. The links may be universal resource identifiers for example. Selecting a displayed result would then initiate the link to the desired information item which the user seeks.

Figure 13:
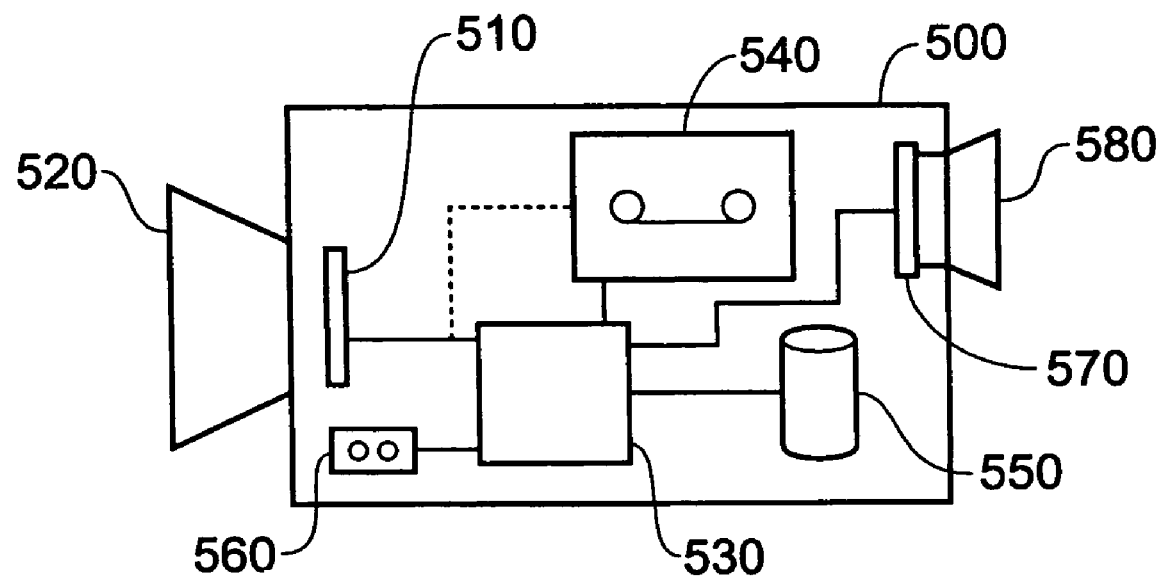
FIG. 13 schematically illustrates a camcorder as an example of a video acquisition and/or processing apparatus.

FIG. 13 schematically illustrates a camcorder 500 as an example of a video acquisition and/or processing apparatus, the camcorder including an image capture device 510 with an associated lens 520; a data/signal processor 530; tape storage 540; disk or other random access storage 550; user controls 560; and a display device 570 with eyepiece 580. Other features of conventional camcorders or other alternatives (such as different storage media or different display screen arrangements) will be apparent to the skilled man. In use, MetaData relating to captured video material may be stored on the storage 550, and an SOM relating to the stored data viewed on the display device 570 and controlled as described above using the user controls 560.

Figure 14:
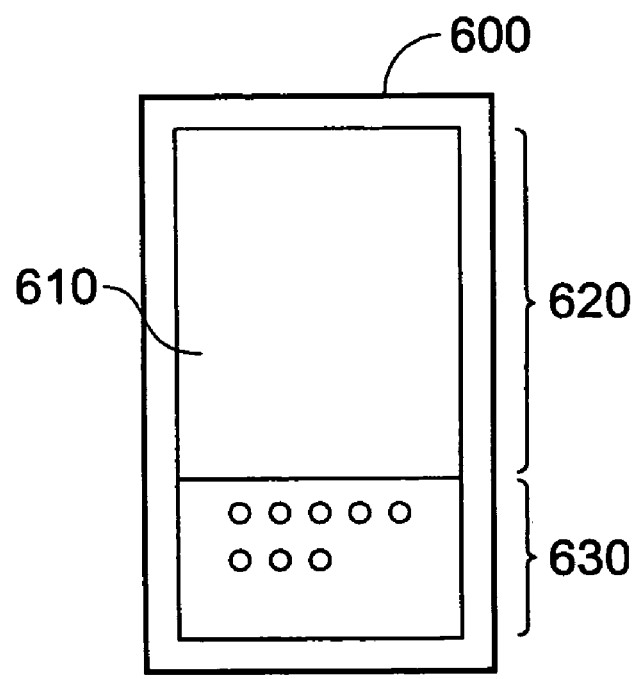
FIG. 14 schematically illustrates a personal digital assistant as an example of portable data processing apparatus.

FIG. 14 schematically illustrates a personal digital assistant (PDA) 600, as an example of portable data processing apparatus, having a display screen 610 including a display area 620 and a touch sensitive area 630 providing user controls; along with data processing and storage (not shown). Again, the skilled man will be aware of alternatives in this field. The PDA may be used as described above in connection with the system of FIG. 1.

The paper "Interfaces for Palmtop Image Search" by Mark Derthick, Human Computer Interaction Institute, Carnegie Mellon University (Proc Joint ACM/IEEE Conference on Digital Libraries, Portland, Oreg., USA, July 2002, pp 340-341) describes experiments in the use of RSVP on a palm top.

Figure 15:
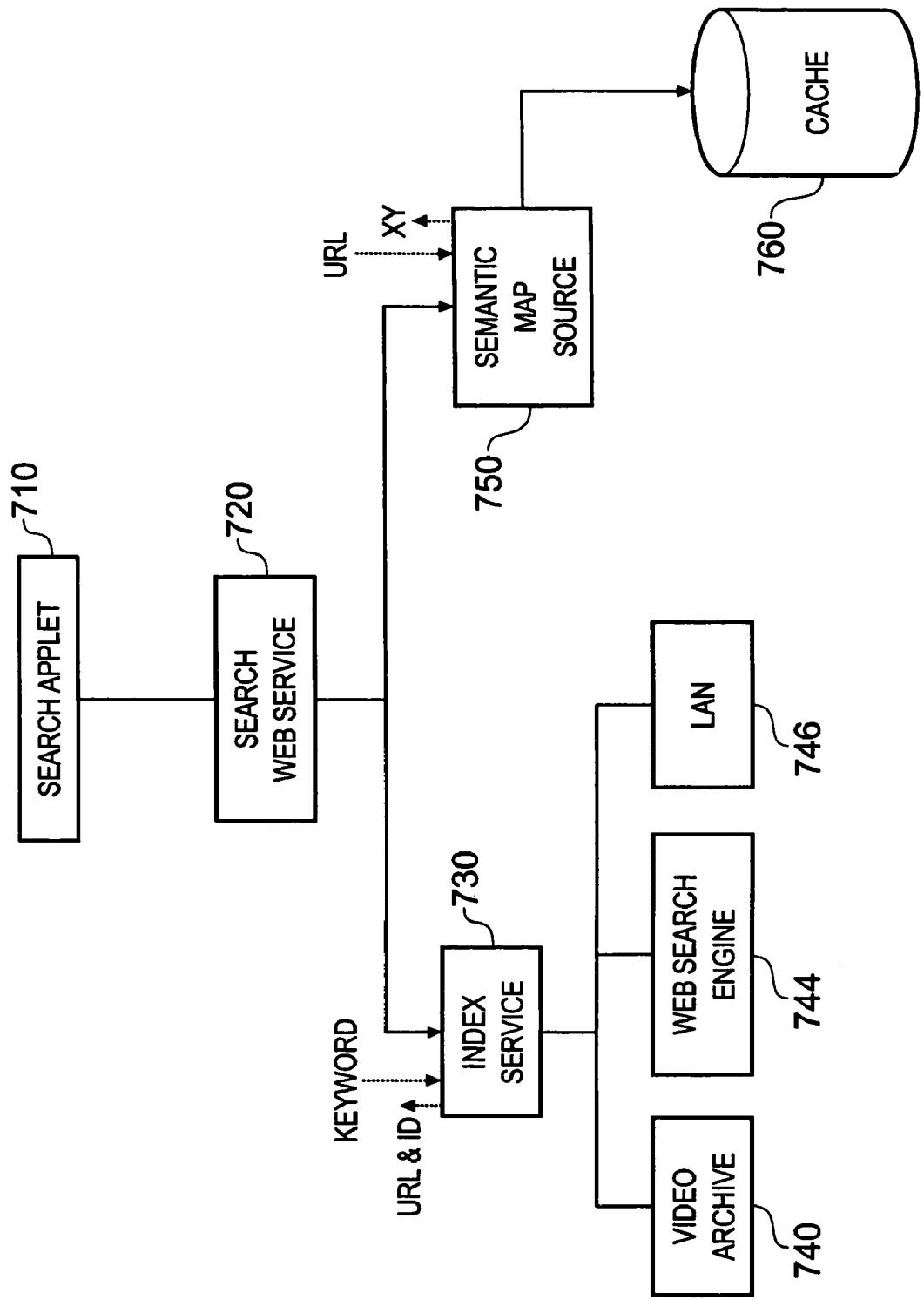
FIG. 15 schematically illustrates an embodiment that provides a search interface for information stored locally and/or remotely at various sites across the Internet.

FIG. 15 schematically illustrates an embodiment of the invention that provides a search interface for information stored both locally and/or remotely, at various sites across the internet. The arrangement comprises a search applet 710, a search web service 720, an index service 730 that interfaces with information sources such as a video archive 742, a web search engine 744 and a local area network (LAN) 746. The arrangement also comprises a semantic map service 750 and an associated cache 760.

The search applet 710 provides a user interface via which the user can enter a search query. The applet is a small application program written in Java, the object-oriented programming language, which can be referenced by the hypertext markup language (HTML) source code of a web page. The search applet 710 can be dynamically downloaded from a Web server to an Internet browser and it executes within the environment provided by the browser. Java is a computer programming language that is designed for use in the distributed computing environment of the Internet. Java programs are portable within a computer network since the source programs are compiled into Java bytecode, which can be run anywhere in a network on a server or client that has a Java virtual machine. The Java virtual machine serves to interpret the bytecode.

To initiate the search the user enters a keyword of interest into a dialog box of a graphical user interface (GUI) associated with the applet and then hits the return key on a computer keyboard or clicks on a "search" action button of the GUI using a mouse. The applet then initiates retrieval of information in dependence upon the user-entered keyword. The search applet 710 communicates with the search web service 720 using Simple Object Access Protocol (SOAP).

SOAP is a protocol that allows a program running in one kind of operating system to communicate with a program in either the same or another operating system using both the Hypertext Transfer Protocol (HTTP) of the World Wide Web and its Extensible Markup Language (XML) as the mechanisms for information exchange. SOAP specifies how to encode an HTTP header and an XML file so that a program in one computer can call a program in a different computer and pass it information. It also specifies how the called program can return a response. By using HTTP SOAP enables a program call to penetrate the firewall servers that are used to screen out requests other than those for known applications, since HTTP requests are usually allowed through firewalls. SOAP comprises three main components: firstly it provides an envelope defining a framework for the contents of a message and how to process the message; secondly it provides a set of encoding rules for flagging instances of application-defined data types; and thirdly it provides a convention for representing remote procedure calls and responses. The present embodiment uses an implementation of SOAP known as AXIS. Alternative embodiments of the invention use protocols other than SOAP to interface between the search applet and the available services. For example alternative embodiments could use a Java Remote Method Invocation (RMI), a Remote Procedure Call (RPC) or a simple Transmission Control Protocol/Internet Protocol (TCP/IP) socket for this purpose.

HTTP is an application layer protocol that comprises a set of rules defining the exchange of text, images, sound, video and other multimedia files on the Web. One of the fundamental concepts of HTTP is that files can contain hypertext links which provide cross-references to information existing anywhere on the Internet. Information, in the form of HTML files, can be transferred or downloaded at the request of a client.

XML is a markup language. The familiar markup language HTML provides instructions to a web browser on how to display a web page's text and images by defining document structure in terms of headings and titles and its presentation in terms of e.g. captions and fonts. By way of contrast, XML provides ways both to define common information formats and to share these formats and associated data on the Web and on intranets. While HTML is restricted to defining how text and information can be displayed and interacted with, XML can give contextual information about a document's contents by allowing application developers to define custom tags which mark sections or words in a document as belonging to a specific data category, e.g. the tags <DATE> and <CHANNEL> could be defined for use in a document containing television programme listings. Data processing tasks can be performed on the XML documents by making use of the custom tags to identify and extract selective information. This is particularly useful for selectively retrieving and categorising content from voluminous information repositories e.g. video archives and document collections.

The Web search service 720 has a Java application server platform and it communicates with the index service 730 and the semantic map source 750 via HTTP. The web search service 720 delivers the user-entered keyword to the index service 130. The index service 730 provides an interface to content in three different information repositories, that is, the video archive 742, the Internet 744 and a local area network 746. The user-entered keyword is supplied to a Web search engine such as "Google"™ to locate relevant web pages. A web search engine is a coordinated set of computer programs that includes: a "spider" that goes to every page or representative pages on every Web site that is search enabled, analyses the content of the web page and uses hypertext links on each page to access other pages of the Web site; a program that creates an extensive index from the web pages that have been read; and a program that receives a search request, compares it to entries in the index and returns matching search citations.

Information content in the video archive 742 and the LAN 746 may be pre-logged. The index service 730 collates from the three repositories 742, 744, 746, all information content determined to be relevant to the user-entered keyword and returns an information locator, short title and brief descriptor for each information item "hit". A uniform resource locator (URL) is used as the information locator. For Web pages a URL typically identifies the HTTP protocol, an Internet server location and a file path and name. However, URLs are also used to identify and locate files in the video archive 742 and on the LAN 746. The URLs and corresponding document descriptors are supplied to the semantic map source 750 where an information item similarity mapping analysis is performed as described above with reference to FIGS. 2 to 6.

In order to generate the feature vector appropriate to each information item for which a URL has been supplied, information is downloaded by the semantic map source 750 and a word frequency analysis is performed on the downloaded data. Recall that the value of each feature vector component is equal to the relative frequency of occurrence of the corresponding word in the document or indeed the metadata describing the associated video clip. Alternatively a function of the frequency of occurrence and the importance of the word can be used to determine feature vector components. To facilitate generation of the feature vectors, the semantic map source 750 is capable of concurrently downloading information from the supplied URLs on 200 parallel program threads. A thread is a sequence of execution within a computer program process. A thread does not have its own address space but uses the memory and other resources of the process in which it executes. The threaded nature of the download improves the efficiency of the mapping. An (x, y) mapping point is calculated from the reduced feature vector for each URL associated with the search keyword, i.e., for each search citation. The (x, y) mapping is used together with the information item descriptor to provide an abstract representation and visualisation of the relationship between search citations via clustering of display points on nodes of the SOM display area 270. Before a mapping operation is performed for each URL, the contents of the cache 760 are first checked to determine if the particular URL has been recently mapped. If a cache hit is established then the (x, y) mapping value is read directly from cache so there is no need either to download the information item or to recalculate the feature vector.

Figure 16:
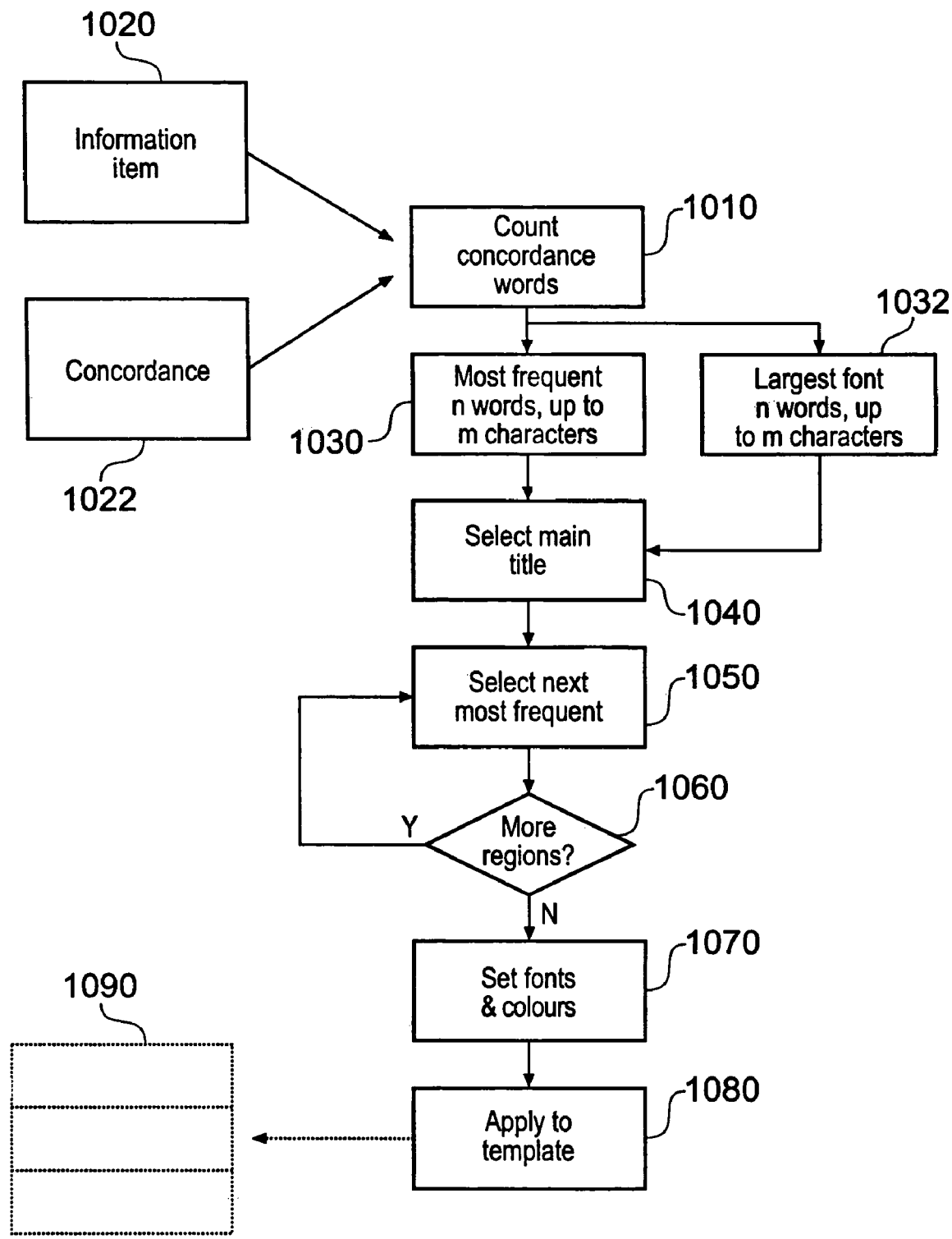
FIG. 16 is a flow chart that schematically illustrates how a representative pseudo-image is generated from an information item.

FIG. 16 is a flow chart that schematically illustrates how a representative pseudo-image is generated from an information item. To determine the relative significance of constituent information elements of the information item a word frequency analysis is performed. This analysis makes reference to a concordance of stopped and stemmed words maintained by the semantic map source 760. In this embodiment the primary concordance, which comprises word stems associated with each dimension of the feature vector is used. However, alternative embodiments use an "update concordance" comprising both word stems of the feature vector and newly encountered word stems derived from search citations analysed by the semantic map source since the most recent map retraining computation. At stage 1010 the textual information from an information item 1020 is stopped and stemmed and the frequency with which each word stem of the concordance 1022 appears in that textual matter is established. In this case the constituent information elements are the word stems found in both the textual matter of the information element and the concordance. The textual matter may correspond either to the raw text of a web page/document or to metadata that accompanies an audio/video file. At stage 1030 a predetermined number "n" of the most frequently occurring word stems having up to "m" (an integer number) of characters are selected as the subset of most significant constituent information elements of the information item 1020 appropriate for inclusion in the pseudo-image. As an alternative to using the word stem frequency count as a measure of relative significance, the nature of occurrence of the words can be used. Accordingly at stage 1032, the textual matter of the information item is analysed by extracting n words of up to m characters that are represented in the largest text font size. This approach exploits the fact that titles and section headings in the textual matter are likely to be associated with the largest fonts. In this case the words are not stopped and stemmed so that grammatical distortion of title phrases is avoided. Next, at stage 1040, a main title to be displayed most prominently in a first predetermined area of the pseudo-image is selected. The first predetermined area in this embodiment corresponds to the central portion 1092 of the pseudo-image 1090. This main title could correspond simply to the most frequently occurring word stem(s) or to the largest font word(s). However, where the information item has been cited in response to a search enquiry initiated by the user, words and phrases corresponding to the search keyword are preferentially weighted in the word frequency analysis. These keywords are considered to be of higher relative significance in the context of the search results. Once the text appropriate to the main title has been selected at stage 1040, the process proceeds to stage 1050 where the text for the next predetermined image region corresponding to the uppermost portion 1094 of the pseudo-image 1090 is selected. The next most frequently occurring n' words having up to m characters are assigned to the uppermost portion 1094 of the pseudo-image. At stage 1060 it is determined whether there are further image regions in the predetermined pseudo-image format for which text should be selected. In the event that there are further image regions, the process returns to stage 1050 and selects the next most frequent predetermined number of words. In this example there is a further lower portion 1096 of the pseudo image to which text should be allocated so stage 1050 is repeated. The second time that stage 1060 is encountered all image regions have already had text assigned so the process proceeds to stage 1070 where the fonts and colours appropriate to each predetermined image region are selected. At stage 1080 the selected text, fonts and colours are applied to the pseudo-image template and the pseudo-image 1090 is rendered on the display screen.

Figure 17A:
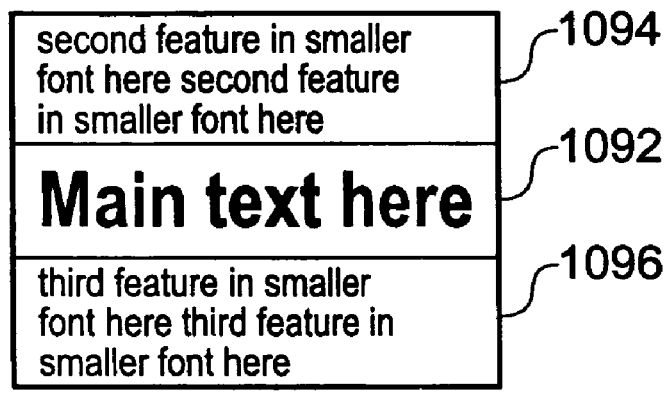
FIGS. 17 A, B and C schematically illustrate example image layouts for the psudo-image of an information item.

FIGS. 17A, B and C schematically illustrate example image layouts for the pseudo-image 1090 of an information item. In each of these three figures, the pseudo image is segmented by two horizontal boundary lines into three distinct predetermined areas: a central portion 1092, an upper portion 1094 and a lower portion 1096. In FIG. 17A the central portion 1092 comprises the most significant representative text from the information element and this is displayed in a large font size. Both the central position in the image and the large font size contribute to making text in this central portion 1092 the most prominent to the user. Thus when a plurality of pseudo-images are serially presented using one of the above-described RSVP techniques and the user has a limited time in which to assimilate information from each image, the most significant representative text is likely to be most readily assimilated. The upper portion 1094 of the pseudo-image 190 displays the next most significant text in an intermediate font size. The text may comprise coherent phrases and/or distinct words. The lower portion 1096 of the pseudo-image 1096 is used to display text that is categorised to be of the same relative significance as the text in the upper region 1094 so it is displayed in the same intermediate font size. The image portions 1092, 1094, 1096 need not have identical areas, for example the central portion could have the largest area and the lowest portion could have the smallest area. However, where the respective image areas are of equal size, it is possible to include a larger volume of text in the areas having a smaller font size.

Figure 17B:
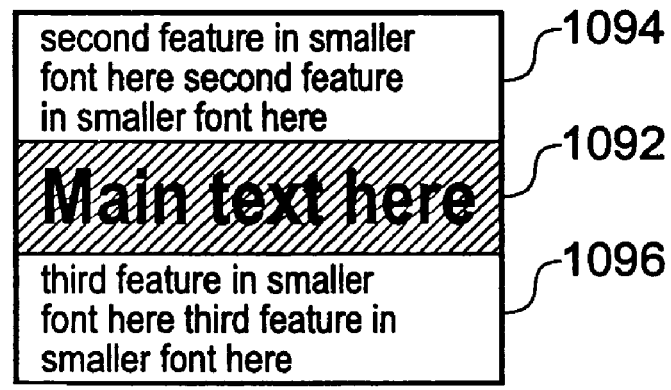

FIG. 17B schematically illustrates how the background fill-characteristics of the respective image regions 1092, 1094, 1096 are used to distinguish text in the more significant image regions. In this case text in the central portion 1092 of the pseudo-image has been emphasised by selecting an appropriate background pattern. A similar effect can be achieved by selecting an appropriately contrasting background colour and/or using bold text in the central portion 1092.

Figure 17C:
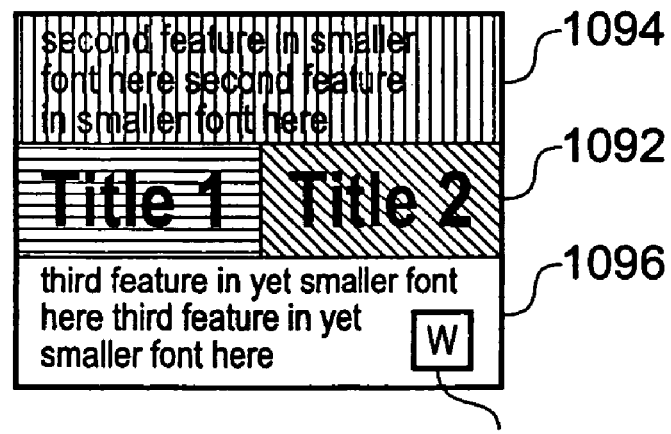

FIG. 17C schematically illustrates the use of split titles in a given image region. In this case the text in the pseudo-image corresponds to three different levels of significance. Again, the most significant text is displayed in the central image region 1092. The text having an intermediate significance level is displayed in a smaller font in the upper image region 1094 whilst the text of least significance is displayed in yet smaller font in the lower image region 1096. The central image region 1092 has been sub-divided by a vertical partition into two sub-regions, each sub region having an associated title phrase. Different background effects distinguish the two central sub-regions although the font size of the text is the same for both title phrases. The upper image region 1094 also has a distinctive background fill effect. FIG. 17C also shows a data type indicator 1098, which is an icon indicating, in this case that the associated information item is a Word document. The data type indicator may alternatively be a spreadsheet logo or a browser logo for example. The purpose of the data type indicator is to differentiate between different types of textual content.

Figure 18:
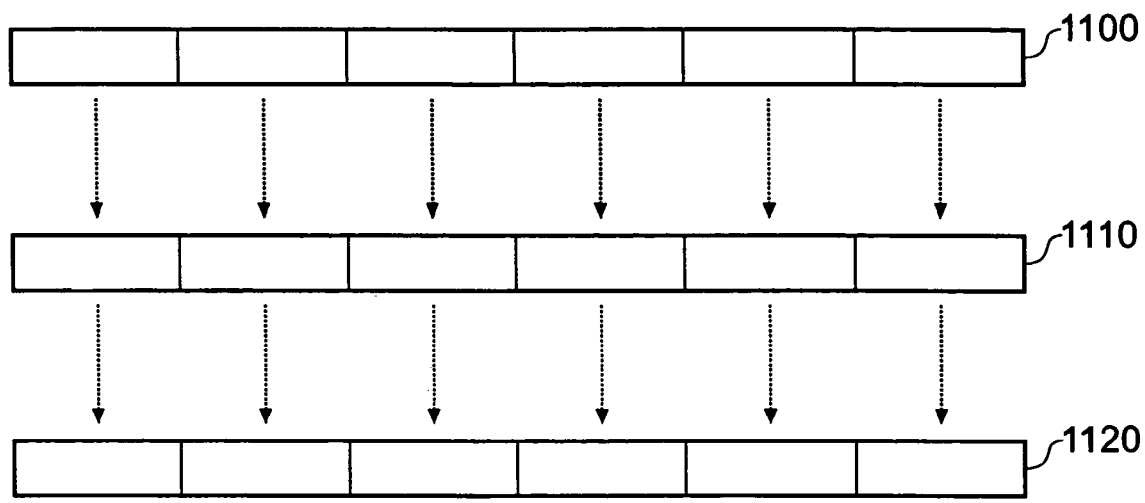
FIG. 18 schematically illustrates how a representative sequence of pseudo-images is generated from an information item.

FIG. 18 schematically illustrates how a representative sequence of pseudo-images is generated from a single information item. For some information items such as individual web pages a single image will suffice to represent its content. However, for other information items, such as a document having many pages, a sequence of linked web pages, an electronic version of a book having a plurality of chapters or a video clip comprising different scenes, it may be appropriate to generate a plurality of pseudo images. A sequence 1100 represents a single information item the content of which has been separated into six distinct segments. Each segment may contain a similar volume of text or other information or alternatively, the segmentation may take account of the pre-existing structure of the information item such as the chapters of a book. A further sequence 1110 represents how each of the six information segments of the further sequence 1110 is separately analysed to select the most significant constituent information elements of that segment. As explained above with reference to the flow chart of FIG. 16 the analysis may be based on word frequency and/or graphical properties of the text as it occurred in the information element. Other aspects of the nature of occurrence of the text in the information item that may be used to objectively assess the relative significance include: the physical location of the text on the page of an information item (e.g. text at the top of the page may be considered to be more significant); whether the text appears in a URL; in the metatags of a web page; or in links to other web pages.

A final sequence 1120 illustrates how the relevance measures of each information segment are applied to a standard image layout to generate a series of representative pseudo-images. As shown by the arrows connecting elements of the three sequences 1100, 1110, 1120, there is a one-to-one mapping between the information segments and the respective relevance measures and between those relevance measures and the representative pseudo-images. The final sequence

1120 is an ordered sequence comprising six pseudo-images, each pseudo-image comprising only the most significant content of each information segment. The sequence 1120 could be serially presented to the user in an automated manner using an RSVP technique or alternatively, the user can manually scan through the sequence 1120 at a variable rate to obtain an overview of the content of the information item. The information content of each pseudo-image represents the most significant subset of information from the corresponding segment of the information element. This has the advantage of reducing the volume of information presented to the user thereby reducing the assimilation time required to absorb the information. The selected text is reformatted and re-positioned to further reduce the assimilation time and to promote most rapid assimilation of the most significant category of information.

Figure 19:
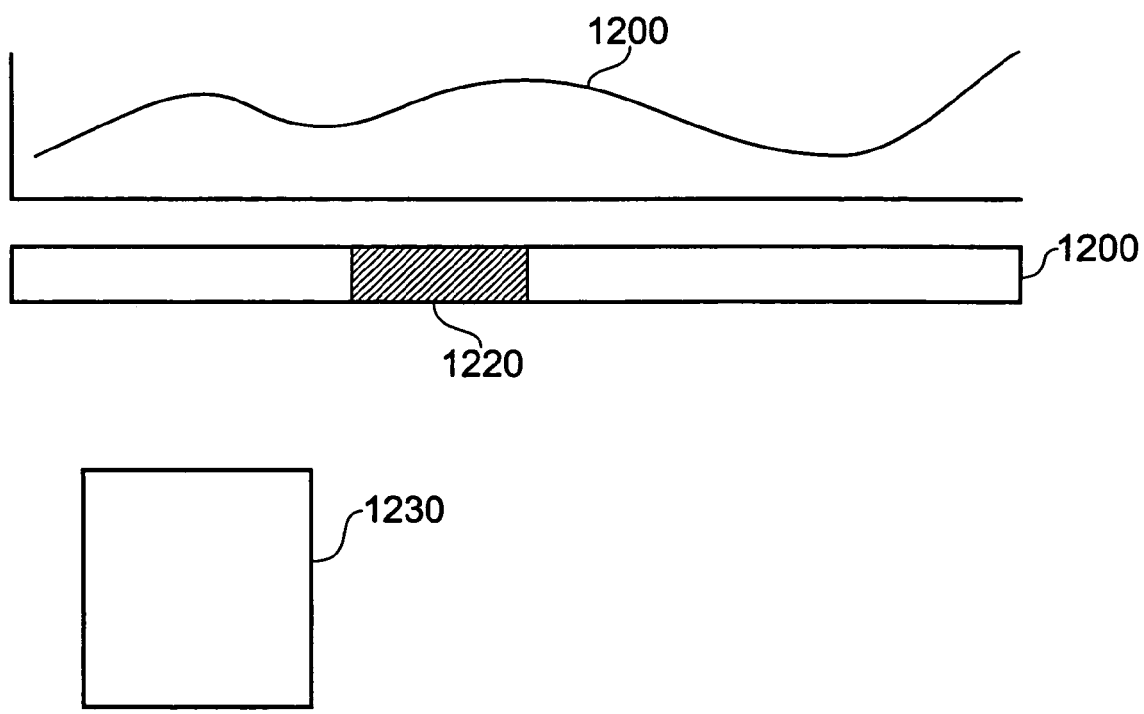
FIG. 19 schematically illustrates a scroll bar associated with a relevancy indicator for use in locating information in information items.

FIG. 19 schematically illustrates a scroll bar and associated relevance indicator for use in locating information in information items. A relevancy graph 1200 indicates the relevance of the information content as a function of position. The position could represent for example a location on a timeline for a video clip. Alternatively, it could be the current location within a document. The abscissa of the relevance graph corresponds to the full extent of a sliding scale range of a scroll bar 1220. The scroll bar is used to navigate through the information item content. The ordinate of the relevance graph indicates the relevance, for example in terms of a percentage, of the content corresponding to the associated scroll bar position. A window 1230 displays a representative keystamp image or a pseudo-image derived from the information content at the current position of the scroll bar. The use of a pseudo image has the advantage that it improves assimilation of information even when the scroll bar is moved rapidly and the image in the window 1230 rapidly changes. The relevance measure on the ordinate is dependent upon a keyword, such as a search enquiry keyword, entered by the user. In the case of an information item comprising video material, the accompanying metadata may be used to assess the relevance of each shot or scene. The portion of the information item where at least one match to that keyword has been found will correspond to a local maximum and the most significant portion of the information content will be indicated by a global maximum. Thus the relevance graph 1200 allows the user to navigate directly to portions of information content most relevant to the search criteria.

Figure 20:
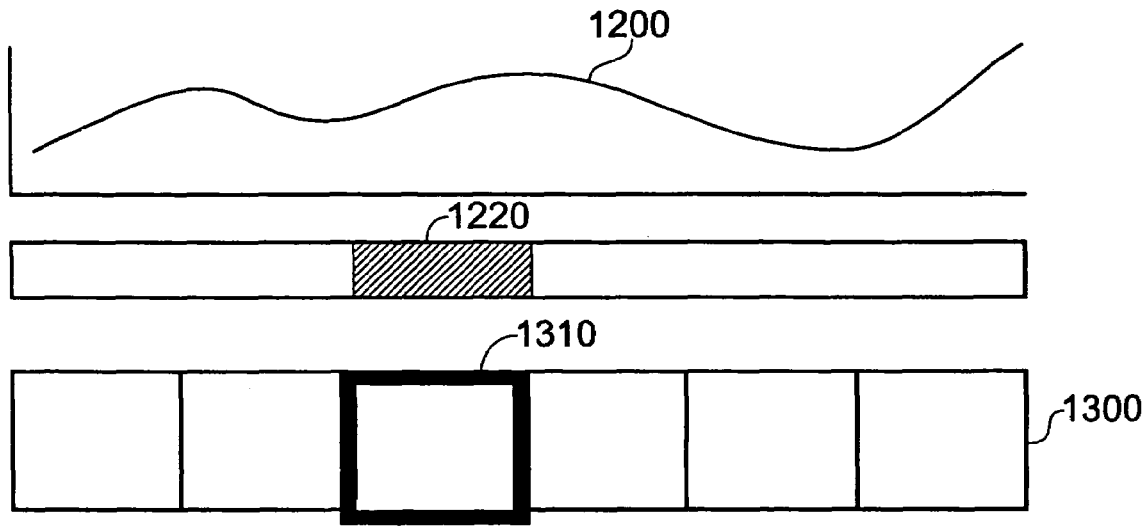
FIG. 20 schematically illustrates a relevance graph and a scroll bar as used with a concurrently displayed sequence of representative images.

FIG. 20 schematically illustrates how a relevance graph and scroll bar is used together with a concurrently displayed sequence 1300 of representative images. As the scroll bar is dragged along the sliding scale 1200, a representative image 1310 corresponding to the content at the current scroll bar position is highlighted to distinguish it from other images of the sequence. Each of the sequence of six representative images 1300 could correspond to a given shot within a video sequence, a given chapter in an electronic version of a book or a given page in a particular electronic document. Navigation through the information content can be effected either by dragging the scroll bar 1220 or by selecting and highlighting a given representative image. Any change to the position of the scroll bar results in a corresponding change to the currently highlighted representative image and vice versa. A shortcut or hypertext link may be provided from a representative image to an executable file such that when the image is double-clicked using a mouse, the video shot is played or a sequence of pseudo-images appropriate to that information segment is serially presented.

Figure 21:
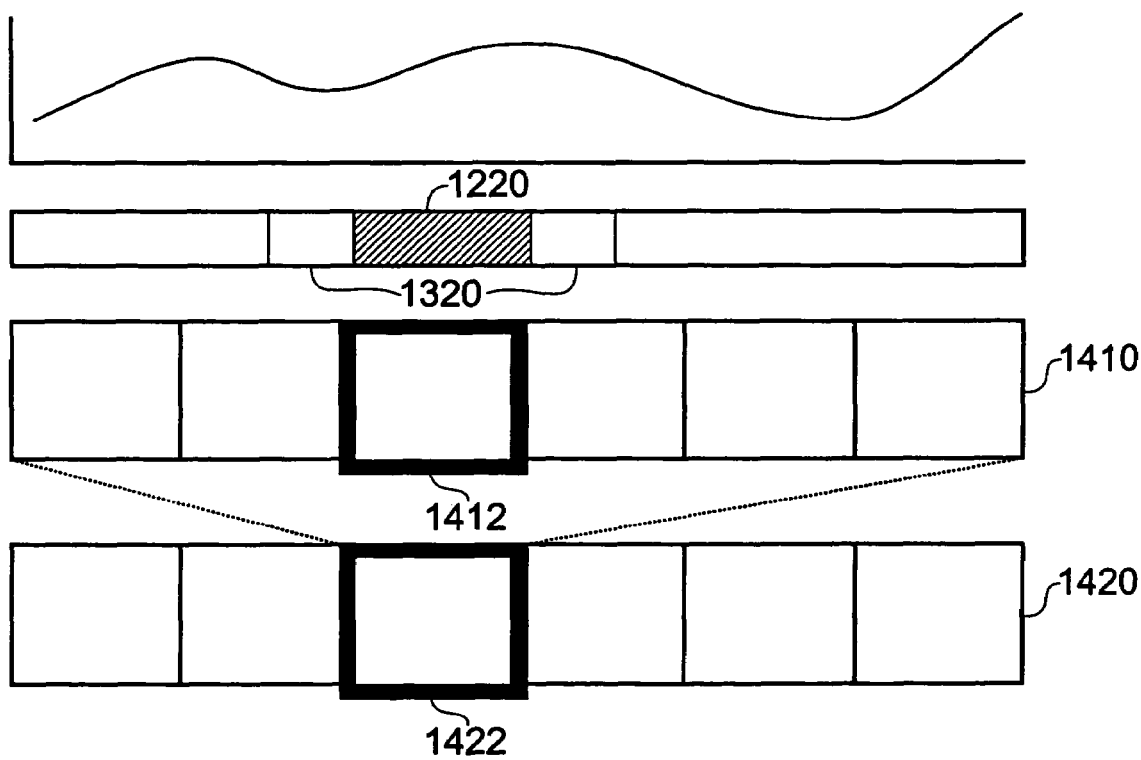
FIG. 21 schematically illustrates an embodiment in which two different sub-divisions of information are displayed to the user together with the relevancy graph and scroll bar.
Figure 22:
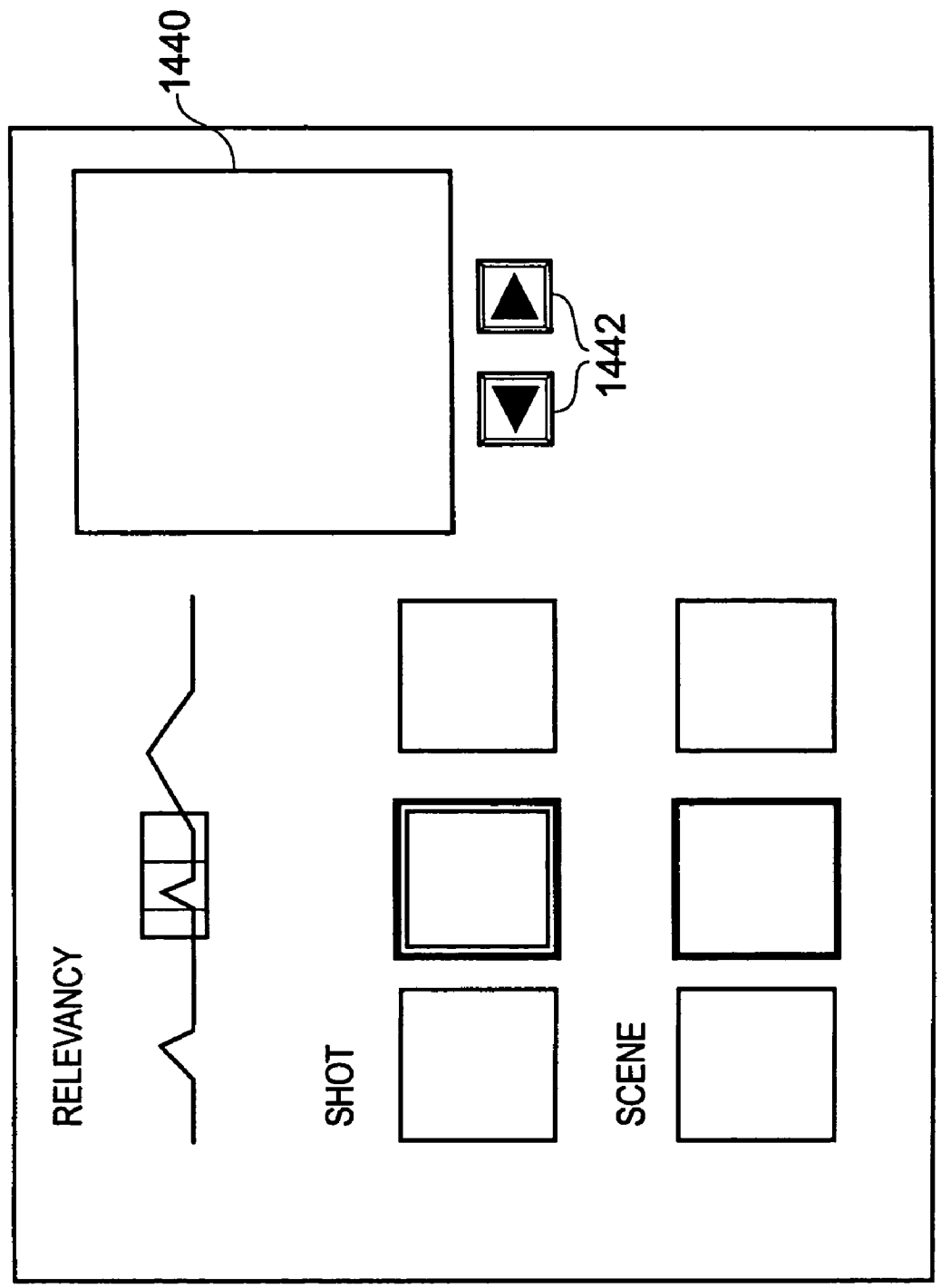
FIG. 22 schematically illustrates an embodiment in which a slider bar is overlaid on the relevancy graph itself.

FIG. 21 schematically illustrates an alternative embodiment in which two different sub-divisions of information are displayed to the user together with the relevancy graph and scroll bar. The upper sequence 1410 of six images corresponds to six distinct shots whereas the lower sequence 1420 of six images corresponds to six distinct scenes. Each scene comprises a plurality of shots so, for example, the scene represented by image 1422 comprises the six shots represented by the upper sequence of images 1410. In FIG. 22 the image 1322 for the third scene in the sequence and the image 1412 representing the third shot of that scene are highlighted in accordance with the current position of the scroll bar. In this arrangement the scroll bar has a central shaded region 1220, whose location is representative of the shot 1412 and this central region is flanked by two lobes 1320 whose full extent represent the location of the scene 1422 within the information item. Alternatively, the upper sequence of images 1410 could correspond to pages whereas the lower sequence of images could correspond to chapters of a book or sections of a document and the representative images could be pseudo-images displaying the most significant textual information.

FIG. 22 schematically illustrates an embodiment in which a slider bar is overlaid on the relevancy graph itself. This arrangement also has a viewing window 1440 with associated user controls 1442 in which a video clip can be played or in which web/text pages of theoriginal information item can be scrolled through.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method implemented by an information processing device, for processing a plurality of documents including a set of documents including primarily text information, said method comprising:
   for each document including primarily text information:
   analyzing, by the information processing device, said text information of said document to detect a set of words relating to said document;
   detecting, by the information processing device, for each of said set of words a respective degree of relative significance based on at least one of a frequency and a nature of occurrence of the words with respect to said document;
   selecting a subset of most significant words from said set of words, said subset containing significantly less words than said set of words;
   generating a pseudo-image representative of said document, said representative pseudo-image including said selected subset of words arranged in a predetermined image layout such that:
   a most significant word of said subset is represented with most prominence at a first predetermined region within said representative pseudo-image, and
   one or more other word(s) of said subset are represented at at least one other predetermined region of said representative pseudo-image in dependence on the corresponding degree of relative significance of those word(s); and
   displaying in a sequence over time said set of documents including the most significant word in the first predetermined region and the one or more other word(s) in the at least one other predetermined region.

2. The method according to claim 1, wherein said most significant word is represented in a central region of said representative pseudo-image.

3. The method according to claim 1, wherein said predetermined regions of the representative pseudo-image have associated image background colours.

4. The method according to claim 1, wherein text information is represented in said predetermined regions of said representative pseudo-image using a text font size dependent on a relative significance of said words represented in those regions.

5. The method according to claim 1, wherein at least one document of said set of documents is a web page.

6. The method according to claim 1, further comprising:
generating a pseudo-image representative of said document including primarily image or video information, said sequence of representative pseudo-images including a representation of an image from the document including primarily image or video information.

7. The method according to claim 1, further comprising:
providing a user control to allow a user to select one of said plurality of documents by operating said user control when a representative pseudo-image in respect of said document is displayed.

8. The method according to claim 1, wherein said time-sequence of representative pseudo-images are displayed with a substantially constant image display size.

9. The method according to claim 1, further comprising:
applying a search query to said plurality of documents, said set of documents being derived from said plurality of documents by the results of the search query.

10. The method according to claim 1, wherein said detecting includes detecting for each of said words a respective degree of relative significance based on a respective position of said words with respect to said document.

11. The method according to claim 1, wherein said detecting includes detecting for each of said words a respective degree of relative significance based on a prominence of occurrence of said words with respect to said document.

12. A method implemented by an information processing device, for processing a plurality of documents including a set of documents including primarily text information and video information, said method comprising:
for each document including primarily text information and video information:
analyzing, by the information processing device, said text information of said document to detect a set of words relating to said document;
detecting, by the information processing device, for each of said set of words a respective degree of relative significance based on at least one of a frequency and a nature of occurrence of the words with respect to said document;
selecting a subset of at least two most significant words from said set of words, said subset containing significantly less words than said set of words;
generating a pseudo-image representative of said document, said representative pseudo-image including said selected subset of words arranged in a predetermined image layout such that:
a most significant word of said subset is represented with most prominence and at a first predetermined region within said representative pseudo-image, and
one or more other word(s) of said subset are represented at at least one other predetermined region of said representative pseudo-image in dependence on the corresponding degree of relative significance of those word(s); and
deriving a plurality of representative pseudo-images relating to different respective positions within said document including text information and video information.

13. The method according to claim 12, further comprising:
applying a search query to information represented by different respective positions within said document; and
generating a graphical representation of the relevance of information represented by said different respective positions to said search query.

14. A computer readable medium encoded with a computer program configured to cause a processor-based device to execute a method of processing a plurality of documents including a set of documents including primarily text information, the method comprising:
for each document including primarily text information:
analyzing text information of said document to detect a set of words relating to said document;
detecting for each of said set of words a respective degree of relative significance based on at least one of a frequency and a nature of occurrence of the words with respect to said document;
selecting a subset of at least two most significant words from said set of words, said subset containing significantly less words than said set of words;
generating a pseudo-image representative of said document, said representative pseudo-image including said selected subset of words arranged in a predetermined image layout such that:
a most significant word of said subset is represented with most prominence and at a first predetermined region within said representative pseudo-image, and
one or more other word(s) of said subset are represented at at least one other predetermined region of said representative pseudo-image in dependence on the corresponding degree of relative significance of those word(s); and
displaying in a sequence over time said set of documents including the most significant word in the first predetermined region and the one or more other word(s) in the at least one other predetermined region.

15. An information processing system configured to process a plurality of documents including a set of documents including primarily text information, the system comprising:
a text analyzer configured to analyze text information of said document to detect a set of words relating to said document;
a detector configured to detect for each of said set of words a respective degree of relative significance based on at least one of a frequency and a nature of occurrence of said words with respect to said document;
a selector configured to select a subset of at least two most significant words from said set of words, said subset containing significantly less words than said set of words;
a generator configured to generate a pseudo-image representative of said document, said representative pseudo-image including said selected subset of words arranged in a predetermined image layout such that:
the most significant word of said subset is represented with most prominence and at a first predetermined region within the representative pseudo-image, and
one or more other word(s) of said subset are represented at least one other predetermined region of said representative pseudo-image in dependence on corresponding ones of said degrees of relative significance of those word(s); and
a display screen configured to display in a sequence over time said set of documents including the most significant word in the first predetermined region and the one or more other word(s) in the at least one other predetermined region.

16. A portable data processing device comprising a system according to claim 15.

17. Apparatus for at least one of video acquisition and video processing comprising a system according to claim 15.

* * * * *